US010182266B2

(12) United States Patent
Panchaksharaiah et al.

(10) Patent No.: US 10,182,266 B2
(45) Date of Patent: *Jan. 15, 2019

(54) SYSTEMS AND METHODS FOR AUTOMATICALLY ENABLING SUBTITLES BASED ON DETECTING AN ACCENT

(71) Applicant: Rovi Guides, Inc., San Jose, CA (US)

(72) Inventors: Vishwas Sharadanagar Panchaksharaiah, Karnataka (IN); Vikram Makam Gupta, Karnataka (IN)

(73) Assignee: Rovi Guides, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/816,602

(22) Filed: Nov. 17, 2017

(65) Prior Publication Data

US 2018/0220195 A1 Aug. 2, 2018

Related U.S. Application Data

(63) Continuation of application No. 15/419,284, filed on Jan. 30, 2017, now Pat. No. 9,854,324.

(51) Int. Cl.
*H04N 21/258* (2011.01)
*G10L 15/06* (2013.01)
(Continued)

(52) U.S. Cl.
CPC ....... *H04N 21/4884* (2013.01); *G10L 15/005* (2013.01); *G10L 15/187* (2013.01); *H04N 21/25883* (2013.01); *H04N 21/4394* (2013.01); *H04N 21/44218* (2013.01); *H04N 21/44222* (2013.01); *H04N 21/4532* (2013.01); *H04N 21/8106* (2013.01)

(58) Field of Classification Search
CPC ....... H04N 21/258; G10L 15/00; G10L 15/02; G10L 15/063
USPC ........... 725/34; 704/200, 231, 236, 246, 250
See application file for complete search history.

(56) References Cited

U.S. PATENT DOCUMENTS 6,239,794 B1 5/2001 Yuen et al.
6,564,378 B1 5/2003 Satterfield et al.
(Continued)

FOREIGN PATENT DOCUMENTS

EP 2 852 168 3/2015

*Primary Examiner* — Dominic D Saltarelli
(74) *Attorney, Agent, or Firm* — Haley Guiliano LLP

(57) ABSTRACT

Systems and methods are described for automatically enabling subtitles based on a user profile when a language is spoken with an accent a user has difficulty understanding. For example, a media guidance application may detect a first plurality of user interactions of the user while the given language is being spoken with the accent. Based on the first plurality of interactions, the media guidance application may calculate a first value associated with a user specific level of difficulty indicating how difficult it is for the user to understand the language when spoken with the accent. If the first plurality of user interactions are not being performed again, the media guidance application may update the user specific difficulty with a second value that is lower than the first value. The media guidance application may automatically generate for display subtitles for a media asset based on the user specific level of difficulty.

20 Claims, 13 Drawing Sheets

(51) Int. Cl.

| | |
|---|---|
| ***G10L 15/00*** | (2013.01) |
| ***H04N 21/488*** | (2011.01) |
| ***H04N 21/45*** | (2011.01) |
| ***H04N 21/439*** | (2011.01) |
| ***H04N 21/442*** | (2011.01) |
| ***G10L 15/187*** | (2013.01) |
| ***H04N 21/81*** | (2011.01) |
| *G10L 15/02* | (2006.01) |

(56) References Cited

U.S. PATENT DOCUMENTS

| | | | | |
|---|---|---|---|---|
| 7,165,098 | B1 | 1/2007 | Boyer et al. | |
| 7,487,096 | B1 | 2/2009 | Cox et al. | |
| 7,761,892 | B2 | 7/2010 | Ellis et al. | |
| 8,046,801 | B2 | 10/2011 | Ellis et al. | |
| 2002/0174430 | A1 | 11/2002 | Ellis et al. | |
| 2005/0251827 | A1 | 11/2005 | Ellis et al. | |
| 2006/0072727 | A1 | 4/2006 | Bantz et al. | |
| 2007/0219776 | A1* | 9/2007 | Gamon | G06F 17/27 704/9 |
| 2007/0250318 | A1* | 10/2007 | Waserblat | G10L 15/07 704/236 |
| 2008/0154870 | A1 | 6/2008 | Evermann et al. | |
| 2010/0153885 | A1 | 6/2010 | Yates | |
| 2014/0303958 | A1 | 10/2014 | Lee et al. | |
| 2015/0373428 | A1 | 12/2015 | Trollope et al. | |
| 2015/0382064 | A1 | 12/2015 | Aravamudan | |
| 2016/0014476 | A1 | 1/2016 | Caliendo et al. | |

* cited by examiner

1000

1004 1006

1002

| User Interaction | Value |
|---|---|
| "What?" | 7 |
| "I Can't Understand Him" | 10 |
| Raising Volume | 5 |
| Enabling Subtitles | 10 |
| Rewinding | 9 |
| Pausing | 3 |
| Cocking Head to One Side | 2 |
| Squinting | 6 |
| Move Close to TV | 4 |
| Put Hand to Ear | 6 |

FIG. 10

SYSTEMS AND METHODS FOR AUTOMATICALLY ENABLING SUBTITLES BASED ON DETECTING AN ACCENT

CROSS-REFERENCE TO RELATED APPLICATION

This application is a continuation of U.S. patent application Ser. No. 15/419,284, filed Jan. 30, 2017, currently allowed, the disclosure of which is hereby incorporated by reference herein in its entirety.

BACKGROUND

It has become increasingly common for actors and actresses with different accents to appear in media released around the world. These accents may make it difficult for certain viewers to understand the dialogue. Traditionally, when there was a specific demographic target for the media (say, an American audience for a film released in the United States), a director or producer would determine when an accent was too heavy for the audience to understand, and insert subtitles during those parts of the media. However, with the global media consumption becoming more and more common, it becomes increasingly difficult to determine exactly when during the media to insert subtitles. In particular, whereas an American may need subtitles to understand English spoken in a thick Indian accent, someone living in India may understand the accent and may find subtitles to be distracting. Manually enabling subtitles each time an actor speaks with an accent, however, may be cumbersome to the viewer and ultimately make the media less enjoyable.

SUMMARY

Accordingly, systems and methods are described herein for automatically enabling subtitles based on determining that a language is being spoken with an accent that the viewer may not understand. For example, using a user profile to determine whether to enable accents will allow users who would have difficulty understanding the accent to fully enjoy the media asset without having to manually enable subtitles, and prevent subtitles from detracting from the media asset when a user understands the accent. As one example, a media asset (e.g., episode 1 of season 1 of "Game of Thrones") may contain an actor (e.g., Sean Bean) who speaks a language (e.g., English) with a thick accent (e.g., a British accent). A user profile associated with a user may indicate that the user understands the language, but may have difficulty understanding the language when spoken with the accent. Based on determining that the user may have difficulty understanding the language when spoken with the accent, a media guidance application may enable subtitles when the actor is speaking. Additionally, the use of the user profile may allow additional customization for the user. For example, if the user watches a number of programs with the language spoken in the accent (e.g., watches many episodes of "Game of Thrones"), then the user may learn to understand the accent over time. The user profile may be updated to reflect this understanding, and the media guidance application may no longer enable subtitles when the language is spoken with the accent.

These systems and methods may be implemented by a media guidance application (e.g., executed by user equipment associated with the user), which may store a list of languages that the user understands in a user profile (e.g., English and Spanish). The media guidance application may determine (e.g., using natural language processing) that a given language in the list (e.g., English) is being spoken with an accent (e.g., a British accent) at a first point in time. The media guidance application may monitor user interactions (e.g., the user saying "I can't understand him" and rewinding the program) while the language is being spoken with the accent, and determine a level of difficulty that the user has in understanding the accent (e.g., a high level of difficulty or nine out of ten). The media guidance application may enable subtitles for a media asset based on the level of difficulty. At a second point in time later than the first point in time, the media guidance application may determine that the user does not perform the user interactions again, and update the level of difficulty to a level of difficulty lower than the original level of difficulty (e.g., a low level of difficulty, or a two out of ten), as the user may now understand the accent. Based on the new level of difficulty, the media guidance application may not enable subtitles.

In some aspects, a media guidance application may store a first data structure indicating a list of one or more languages that a user understands in a user profile associated with the user. For instance, in order create the list of one or more languages that the user understands, the media guidance application may receive a user input indicating that the user understands the English and Spanish languages. The media guidance application may then create the first data structure that identifies the user profile and indicates that the user understands the English and Spanish languages, and store the first data structure in the user profile.

In some embodiments, the media guidance application may determine, at a first point in time, that a given language of the one or more languages in the list is being spoken with an accent. For example, the media guidance application may generate for display episode 1 of season 1 of "Game of Thrones," entitled "Winter is Coming" on Apr. 17, 2016 at 8:30 PM. The media guidance application may use natural language processing to determine that "Winter is Coming" contains audio in which actors are speaking in English with a British accent. In order to determine that the given language is included in the one or more languages in the list, the media guidance application may retrieve the first data structure from the user profile and extract, by executing an SQL script utilizing the declarative "Select" command, the list indicating that the user understands English and Spanish from the first data structure. The media guidance application may then compare English to the one or more languages in the list to determine that English is included in the list of one or more languages.

In some embodiments, the media guidance application may detect a first plurality of user interactions of the user while the given language is being spoken with the accent. In some embodiments, a respective one of the first plurality of user interactions may be at least one of a facial expression, rewinding a previous media asset, pausing the previous media asset, enabling subtitles, increasing the volume, a head movement, a user gesture, a vocal utterance, a user setting input, a user geographic input, a user demographic information input, and a social media post. For example, the media guidance application may detect that the user said "I can't understand him" and rewound "Winter is Coming" while the given language was being spoken with the accent. These interactions may indicate that the user did not understand the dialogue in the British accent in "Winter is Coming" and may have had to rewind "Winter is Coming"

in order to hear the dialogue again, which may further indicate that the user does not understand English when it is spoken with a British accent.

In some embodiments, the media guidance application may store a data log indicating the first point in time and the first plurality of user interactions in the user profile. For example, the media guidance application may create a data log that includes a data field indicating the first point in time, a data field indicating the user interactions, and a data filed identifying the user profile. The media guidance may input Apr. 17, 2016 at 8:30 PM into the data field indicating the first point in time and the user saying "I can't understand him" and rewinding the media asset into the data field indicating the user interactions. The media guidance application may proceed to store, in the user profile, the data log.

In some embodiments, the media guidance application may retrieve an information table, from a remote source, associating user interactions with values. For example, in order to retrieve the information table, the media guidance application may send a query to the remote source for the information table, and may receive, from the remote source, a data packet containing the information table. The values in the information table may represent a general level of difficulty, and the general level of difficulty might be indicative of a measure of difficulty a plurality of users have in understanding accents in audio content. For example, the information table may associate the user interaction of enabling subtitles for a media asset with a value of ten on a scale of one to ten, which may indicate that enabling subtitles for a media asset generally indicates that users have a very difficult time understanding an accent in a media asset.

In some embodiments, the media guidance application may compare the first plurality of user interactions with the information table to determine a first plurality of values. Each of the first plurality of values may be associated with a respective one of the first plurality of user interactions. For example, the media guidance application may search the information table for the user interaction of the user saying "I can't understand him." The media guidance application may then extract, from the information table, the value associated with the user interaction of the user saying "I can't understand him," which may be ten on a scale of one to ten and store that value in a data structure. The media guidance application may then search the information table again for the user interaction of rewinding the media asset, and determine that the value associated with rewinding the media asset may be a nine on the scale of one to ten. The media guidance application may append the new value to the data structure.

In some embodiments, the media guidance application may calculate a first value based on the first plurality of values. For example, the media guidance application may extract the two values (e.g., nine and ten) from the data structure and sum the numbers to determine the first value of nineteen. As another illustrative example, the media guidance application may determine an average of the first plurality of values, which may be nine and a half. As another illustrative example, the media guidance application may sum the first plurality of values, and may apply a maximum value to the sum. For example, the maximum value may be fifteen, and the media guidance application may determine that the first value is fifteen because the sum of the first plurality of values (e.g., nineteen) exceeds the maximum value. As another illustrative example, the media guidance application may determine the first value by calculating a sum of the first plurality of values and then multiplying the sum by the number of values in the first plurality of values. The media guidance application may determine that the sum is nineteen, and then multiply the sum by two because there were two values (e.g., nine and ten) to yield a first value of thirty-eight.

In some embodiments, the media guidance application may include a geographic component when calculating the first value. In order to include the geographic component, the media guidance application may determine the geographic location of the user, for example, by using GPS to determine what zip code the user is in. For example, the media guidance application may determine that the user is located in the zip code 94010.

In some embodiments, the media guidance may then retrieve a second information table associating the geographic location and the accent with an augmenting value. For example, to retrieve the second information table, the media guidance application may query the remote server for the information table, and receive a data packet including the second information table from the remote server. The second information table may be a matrix, where the rows are associated with a plurality of geographic locations, and where the columns are associated with a plurality of accents. The media guidance application may identify the row of the matrix that represents the zip code 94010, and identify the column of the matrix that represents the British accent. The cell that is in the identified row and the identified column may contain the augmenting value, which may be 1.053. The augmenting value may indicate how difficult it is, on average, for users in the geographic region to understand the accent: an augmenting value of 1.053 may indicate that the users in the 94010 zip code have an average difficulty understanding English when spoken with a British accent.

In some embodiments, the media guidance application may calculate the augmenting value by receiving, from a plurality of users located in the geographic location, a plurality of data logs indicating a second plurality of user interactions of the plurality of users detected while the given language was being spoken with the accent on user equipment associated with the plurality of users. For example, the plurality of data logs may be similar to the data log created for the user, and the user interactions may be similar to those described above in relation to the first plurality of user interactions. The media guidance application may compare the second plurality of user interactions with the information table to determine a second plurality of values similar to as described above in relation to comparing the first plurality of values to the information table to determine the first plurality of values. The media guidance may calculate the augmenting value based on the second plurality of values by, for example, calculating a sum of the second plurality of values and dividing the sum of the second plurality of values by an average sum for a plurality of geographic locations.

In some embodiments, the media guidance application may recalculate the first value by combining the augmenting value and the first value. For example, the media guidance application may combine the augmenting value and the first value by multiplying the first value by the augmenting value: for example, the media guidance application may multiply the first value of nineteen with the augmenting value of 1.053 to recalculate the first value as twenty.

In some embodiments, the media guidance application may then create a second data structure. The second data structure may associate the first value with a user specific level of difficulty. For example, the media guidance application may create a second data structure that has a data field indicating the user profile, a data field indicating the language, a data field indicating the accent, and a data field indicative of the user specific level of difficulty. As an illustrative example, the data field indicating the language may indicate the language English, the data field indicating the accent may indicate a British accent, and the data field indicative of the user specific level of difficulty may associate the value twenty with the user specific level of difficulty. The user specific level of difficulty may be indicative of a measure difficulty that the user encounters in understanding the given language when spoken with the accent. For example, the value twenty associated with the user specific level of difficulty in the second data structure may indicate that the user has a very difficult time understanding English when it is spoken with a British accent. In some embodiments, the media guidance application may store the second data structure in the user profile.

In some embodiments, the media guidance application may detect that the given language is being spoken with the accent at a second point in time after than the first point in time. For example, the media guidance application may generate for display episode 1 of season 1 of "Sherlock," entitled "A Study in Pink" on Oct. 17, 2016 at 8:30 PM. The media guidance application may use natural language processing to determine that "A Study in Pink" contains audio in which actors are speaking in English with a British accent. In some embodiments, the media guidance application may retrieve the data log from the user profile based on detecting that the given language is being spoken with the accent at the second point in time. For example, the media guidance application may query the user profile for the data log in response to determining that "A Study in Pink" contains audio in which actors are speaking in English with a British accent. In response, the media guidance may receive the data log.

In some embodiments, the media guidance application may monitor user interactions of the user while the given language is being spoken with the accent at the second point in time to determine whether the first plurality of user interactions are being performed again while the given language is being spoken with the accent. For example, in order to determine if the user is performing the first plurality of user interactions again at the second point in time, the media guidance application may extract, from the data log, the first plurality of user interactions. The media guidance application may monitor the user interactions to determine if the user says "I can't understand him" again or if they rewind "A Study in Pink" while English is being spoken with a British accent. In some embodiments, if the user does perform the first plurality of user interactions again, then the media guidance application may not update the user profile.

In some embodiments, based on determining that that first plurality of user interactions are not performed again, the media guidance application may update the second data structure to associate a second value that is lower than the first value with the user specific level of difficulty. For example, the media guidance application may determine that the user didn't say "I can't understand him" while English is being spoken in a British accent during "A Study in Pink," and didn't rewind the program. Based on this determination, the media guidance application may update the second data structure by inputting a value of six into the data field indicative of the user specific level of difficulty in order to associate the value six with the user specific level of difficulty, which may indicate that the user has little difficulty in understanding English when spoken with a British accent.

In some embodiments, the media guidance application may determine a second plurality of user interactions of the user while the given language is being spoken with the accent. For example, the media guidance application may determine that the user paused "A Study in Pink" and cocked their head to one side while English was being spoken with a British accent during "A Study in Pink." In some embodiments, the media guidance application may determine that the first plurality of interactions are not being performed again by comparing the second plurality of user interactions to the first plurality of user interactions. The media guidance application may determine that pausing the media asset and the user cocking their head to one side is not the same as the user saying "I can't understand him" and the user rewinding the media asset.

In some embodiments, the media guidance may calculate the second value. In some embodiments, in order to calculate the second value, the media guidance application may compare the second plurality of user interactions with the information table to determine a second plurality of values and calculate the second value based on the second plurality of values. For example, the media guidance application may search the information table for the user interaction of the pausing the media asset. The media guidance application may then extract, from the information table, the value associated with the user interaction of the user pausing the media asset, which may be three on a scale of one to ten and store that value in a data structure. The media guidance application may then search the information table again for the user interaction of the user cocking their head to one side, and determine that the value associated with the user cocking their head to one side may be a two on the scale of one to ten. The media guidance application may append the new value to the data structure. The media guidance may then calculate the second value by summing the two values (e.g., two and three) and then multiplying the sum by an augmenting factor determined as described above, which may be 1.2. The media guidance application may then determine that the second value is six.

In some embodiments, the media guidance application may calculate the second value using a decay function based on the elapsed time between the first point in time and the second point in time. The use of a decay function that shows how quickly the average user learns to understand an accent may be useful as it may be less computationally intensive to use a decay function rather than to determine the second plurality of user interactions and use the information table to determine the new second value.

In some embodiments, in order to calculate the second value, the media guidance application may extract, from the data log, the first point in time. For example, the media guidance application may extract Apr. 17, 2016 at 8:30 PM from the data log by executing an SQL script utilizing the declarative "Select" command. In some embodiments, the media guidance application may compare the first point in time to the second point in time to determine an elapsed time between the first point in time and the second point in time. For example, the media guidance application may subtract Apr. 17, 2016 at 8:30 PM from Oct. 17, 2016 at 8:30 PM to determine that the elapsed time is 183 days.

In some embodiments, the media guidance application may retrieve, from the remote source, a decay function. The media guidance may retrieve the decay function by querying the remote source for the decay function, and may receive a data packet containing the decay function from the remote source. The decay function may associate the elapsed time to the user specific level of difficulty. For example, the decay function may be an exponential decay function. In some embodiments, the media guidance application may input the elapsed time and the first value into the decay function to determine the second value. For example, the media guidance application may input the elapsed time of 183 days and the first value of twenty into the decay function, and may determine that the second value is six.

In some embodiments, the media guidance application may calculate the second value using a decay function based on the number of media assets the user watched between the first point in time and the second point in time. The use of a decay function that shows how the user's understanding of an accent changes when they are exposed to the accent may be useful as it may be less computationally intensive to use a decay function rather than to determine the second plurality of user interactions and use the information table to determine the new second value. While it may be more computationally intensive than using a decay function associating the elapsed time to the user specific level of difficulty, it may be more accurate to user a decay function associating the number of media assets to the user specific level of difficulty.

In some embodiments, in order to calculate the second value, the media guidance application may monitor user usage of user equipment to determine a plurality of media assets that the user has watched. Each of the plurality of media assets contain audio with the given language spoken with the accent. For example, the media guidance application may determine that the user watched two episodes of "Game of Thrones" using their set-top box, "Winter is Coming" on Apr. 17, 2016 at 8:30 PM and "The Kingsroad" on Apr. 18, 2016 at 4:00 PM, "Monty Python and the Holy Grail" on their computer on Aug. 5, 2016 at 10:00 AM, "Love Actually" on their tablet on Jul. 27, 2016 at 12:00 PM, and "A Study in Pink" on Oct. 17, 2016 at 8:00 PM on their mobile phone. In some embodiments, the media guidance application may store a usage log indicating the plurality of media assets and when the user watched each of the plurality of media assets. For example, the usage log may have a data field indicating each media asset, a data field indicating a plurality of points in time when the user watched each of the plurality of media assets, and a data field indicating the user profile. In some embodiments, the media guidance application may store the usage log in the user profile.

In some embodiments, the media guidance application may determine the number of media assets in the usage log that the user watched between the first point in time and the second point in time. For example, the media guidance application may extract the plurality of points in time and compare the plurality of points in time to the first point in time and the second point in time to determine how many of the plurality of points in time are between the first point in time and the second point in time. For example, the media guidance application may determine that the user watched "The Kingsroad," "Monty Python and the Holy Grail," and "Love Actually" between Apr. 17, 2016 at 8:30 PM and Oct. 17, 2016 at 8:30 PM, and thus, that number of media assets in the usage log that the user watched between the first point in time and the second point in time is three.

In some embodiments, the media guidance application may retrieve, from the remote source, a decay function relating the number of media assets to the user specific level of difficulty. The media guidance may retrieve the decay function by querying the remote source for the decay function, and may receive a data packet containing the decay function from the remote source. The decay function may associate the number of media assets to the user specific level of difficulty. For example, the decay function may be an exponential decay function. In some embodiments, the media guidance application may input the number of media assets and the first value into the decay function to determine the second value. For example, the media guidance application may input the number of media assets of three and the first value of twenty into the decay function, and may determine that the second value is six.

In some embodiments, the media guidance application may determine the decay function relating the number of media assets to the user specific level of difficulty. The media guidance application may do so by determining an average decay function for other users. For example, to determine the decay function, the media guidance application may receive, at the remote source, a second data log and a third data log from user equipment associated with a second user. The data logs may be similar to the data log for the user described above. The second data log may indicate a third point in time and a second plurality of user interactions that occurred while the user equipment associated with the second user generated for playback audio with the given language spoken in the accent. The third data log may indicate a fourth point in time and a third plurality of user interactions that occurred while the user equipment associated with the second user generated for playback audio with the given language spoken in the accent. For example, the second data log may indicate that the second user said "What?" and enabled subtitles on Mar. 1, 2015 at 7:00 AM and the third data log may indicate that the second user raised the volume of the TV and put a hand to their ear on Jun. 25, 2015 at 5:45 PM.

In some embodiments, the media guidance application may continue to determine the decay function relating the number of media assets to the user specific level of difficulty by comparing the second plurality of user interactions and the third plurality of user interactions to the information table to determine a second plurality of values and a third plurality of values respectively. This may be done in a similar manner as comparing the first plurality of user interactions to the information table to determine the first plurality of values. For example, the media guidance application may determine that the second plurality of values are 7 and 10, associated with the user saying "What?" and enabling subtitles, respectively. The media guidance application may determine that the third plurality of values are 5 and 6, associated with the user raising the volume and putting a hand to their ear, respectively. In some embodiments, the media guidance application may determine a third value based on the second plurality of values and a fourth value based on the third plurality of values in a similar way as described above in determining the first value based on the first plurality of values. For example, the media guidance application may determine that the third value is 17, and may determine that the fourth value is 11.

In some embodiments, the media guidance application may receive, at the remote source, a second usage log indicating a second plurality of media assets that each contain audio with the given language spoken in the accent. The second usage log may be similar to the usage log for the user as described above. The second usage log may indicate that the second user watched "A Study in Pink" on Mar. 1, 2015 at 7:00 AM, "Four Weddings and a Funeral" on May 10, 2015 at 2:00 PM, and episode 1 of season 5 of "Doctor Who," entitled "The Eleventh Hour," on Jun. 25, 2015 at 5:45 PM. In some embodiments, the media guidance application may determine a second number of media assets in the second usage log that the second user watched between the third point in time and the fourth point in time. For example, the media guidance application may do so in a similar manner as described above in relation to determining the number of media assets the user watched between the first point in time and the second point in time. For example, the media guidance application may determine that the user watched one media asset between Mar. 1, 2015 at 7:00 AM and Jun. 25, 2015 at 5:45 PM.

In some embodiments, the media guidance application may determine the decay function relating the number of media assets to the user specific level of difficulty based on the calculated third value, the calculated forth value, and the second number of media assets. For example, the media guidance application may determine a exponential decay function using 17 for the third value, 11 for the fourth value, and 1 for the number of media assets.

In some embodiments, the media guidance application may detect that a media asset includes the given language spoken with the accent. In some embodiments, the media guidance application may determine an accent level with which the given language is spoken in the media asset. The accent level may indicate how slight or how heavy the accent is. For example, the accent level may indicate that the accent level is ten on a scale of one to twenty, or that it the accent is between a slight and a thick accent.

In some embodiments, the media guidance application may detect that the media asset includes the given language spoken with the accent at a certain accent level using natural language processing. In some embodiments, the media guidance application may detect that a media asset includes the given language spoken with the accent using metadata. In some embodiments, the media guidance application may detect that the media asset includes the given language spoken with the accent using metadata by receiving, from a media source, a data structure indicating the media asset, a first portion of the media asset, that the given language is being spoken with the accent during the first portion of the media asset, and the accent level. For example, the media guidance application may generate for display "Harry Potter and the Philosopher's Stone," and the data structure may indicate that, between one minute and thirty-seven seconds from the beginning of "Harry Potter and the Sorcerer's Stone" and two minutes and seven second from the beginning of "Harry Potter and the Sorcerer's Stone," English is being spoken with a British Accent, and an accent level of ten. The media guidance application may extract, from the data structure, the indication that the given language is being spoken with the accent to determine that the media asset includes the given language spoken with the accent.

In some embodiments, the media guidance application may detect that the media asset includes the given language spoken with the accent using metadata by receiving, from a media source, the media asset and a third data structure indicating a first portion of the media asset during which a specific actor appears. For example, the third data structure may indicate the media asset, a first portion of the media asset, and that the specific actor appears during the first portion. For example, the data structure may indicate that, between one minute and thirty-seven seconds from the beginning of "Harry Potter and the Sorcerer's Stone" and two minutes and seven second from the beginning of "Harry Potter and the Sorcerer's Stone," Maggie Smith appears. In some embodiments, the media guidance application may receive, from the remote source, a fourth data structure associating the specific actor with the accent and the accent level. For example, the fourth data structure may indicate the specific actor, that the actor speaks with the accent, and that the actor speaks with the accent level. For example, the fourth data structure may indicate that Maggie Smith speaks English with a British accent and has an accent level of ten. The media guidance application may determine, based on the third and fourth data structures, that between one minute and thirty-seven second and two minutes and seven seconds, "Harry Potter and the Sorcerer's Stone" has audio that contains English spoken with a British accent at an accent level of ten.

In some embodiments, the media guidance application may retrieve the second data structure from the user profile and extract, from the second data structure, the user specific level of difficulty. For example, the media guidance application may send a query for the second data structure, and receive the second data structure from the user profile. In some embodiments, the media guidance application may extract, by executing an SQL script utilizing the declarative "Select" command, the user specific level of difficulty. For example, the media guidance application may determine that the user specific level of difficulty is twenty.

In some embodiments, the media guidance application may automatically generate for display subtitles for the media asset based on the extracted user specific level of difficulty. In some embodiments, the media guidance application may compare the user specific level of difficulty to a threshold level of difficulty to determine whether to automatically generate subtitles. For example, the media guidance application may determine that the threshold level of difficulty may be eleven, and that the user specific level of difficulty is twenty, and based on determining that the user specific level of difficulty is greater than the threshold level of difficulty, the media guidance application may generate for display subtitles for "Harry Potter and the Sorcerer's Stone." As another illustrative example, the media guidance application may determine that the threshold level of difficulty may be eleven, and that the user specific level of difficulty is six, and based on determining that the user specific level of difficulty is less than the threshold level of difficulty, the media guidance application may not generate for display subtitles for "Harry Potter and the Sorcerer's Stone."

In some embodiments, the media guidance application may compare the user specific level of difficulty to the accent level to determine whether to automatically generate subtitles. For example, the media guidance application may determine that the accent level in "Harry Potter and the Sorcerer's Stone" may be ten, and that the user specific level of difficulty is twenty, and based on determining that the user specific level of difficulty is greater than the accent level, the media guidance application may generate for display subtitles for "Harry Potter and the Sorcerer's Stone." In some embodiments, the media guidance application may automatically generate subtitles during the first portion of the media asset. For example, the media guidance application may enable subtitles at one minute and thirty-seven second from the beginning of "Harry Potter and the Sorcerer's Stone" and disable subtitles at two minutes and seven seconds of "Harry Potter and the Sorcerer's Stone."

In some embodiments, the media guidance application may automatically enable subtitles based on two users' user specific level of difficulty. In some embodiments, the media guidance application may detect that a first and second user are watching a media asset simultaneously. For example, the media guidance application may use facial recognition to determine that Bob and Linda are watching "Harry Potter and the Sorcerer's Stone. The media guidance application may retrieve, based on detecting the second user, a third data structure from a user profile of the second user. The media guidance may retrieve the third data structure by sending a query for the third data structure and receiving the third data structure from the user profile. In some embodiments, the media guidance application may extract, from the third data structure, a second user specific level of difficulty for the second user. For example, the media guidance application may extract, by executing an SQL script utilizing the declarative "Select" command, the second user specific level of difficulty. For example, Linda's user specific level of difficulty may be four. The media guidance application may retrieve, based on detecting the first user, a second data structure from a user profile of the second user, and extract a first user specific level of difficulty. For example, the media guidance application may determine that Bob's user specific level of difficulty is twenty.

In some embodiments, the media guidance application may determine the threshold level of difficulty for generating for display the subtitles. For example, the media guidance application may determine that the threshold level of difficulty is eleven. In some embodiments, the media guidance application may determine that at least one of the first user specific level of difficulty and the second user specific level of difficulty exceeds the threshold level of difficulty. For example, the media guidance application may compare Bob's user specific level of difficulty, which may be twenty, and Linda's user specific level of difficulty, which may be four, to the threshold level of difficulty, which may be eleven, to determine that Bob's user specific level of difficulty exceeds the threshold level of difficulty.

In some embodiments, the media guidance application may automatically generate for display subtitles for the media asset based on determining that at least one of the first user specific level of difficulty and the second user specific level of difficulty exceeds the threshold level of difficulty. For example, the media guidance the media guidance application may generate for display subtitles for "Harry Potter and the Sorcerer's Stone" based on determining that Bob's user specific level of difficulty exceeds the threshold level of difficulty, even though Linda's user specific level of difficulty does not exceed the threshold level of difficulty.

It should be noted the systems and/or methods described above may be applied to, or used in accordance with, other systems, methods and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 10 shows an illustrative example of a graphic representation of an information table for determining the general level of difficulty associated with a user interaction, in accordance with some embodiments of the disclosure;

DETAILED DESCRIPTION

Systems and methods are described herein for automatically enabling subtitles based on determining that a language is being spoken with an accent that the viewer may not understand. For example, using a user profile to determine whether to enable accents will allow users who would have difficulty understanding the accent to fully enjoy the media asset without having to manually enable subtitles, and prevent subtitles from detracting from the media asset when a user understands the accent. As one example, a media asset (e.g., episode 1 of season 1 of "Game of Thrones") may contain an actor (e.g., Sean Bean) who speaks a language (e.g., English) with a thick accent (e.g., a British accent). A user profile associated with a user may indicate that the user understands the language, but may have difficulty understanding the language when spoken with the accent. Based on determining that the user may have difficulty understanding the language when spoken with the accent, a media guidance application may enable subtitles when the actor is speaking. Additionally, the use of the user profile may allow additional customization for the user. For example, if the user watches a number of programs with the language spoken in the accent (e.g., watches many episodes of "Game of Thrones"), then the user may learn to understand the accent over time. The user profile may be updated to reflect this understanding, and the media guidance application may no longer enable subtitles when the language is spoken with the accent.

These systems and methods may be implemented by a media guidance application (e.g., executed by user equipment associated with the user), which may store a list of languages that the user understands in a user profile (e.g., English and Spanish). The media guidance application may determine (e.g., using natural language processing) that a given language in the list (e.g., English) is being spoken with an accent (e.g., a British accent) at a first point in time. The media guidance application may monitor user interactions (e.g., the user saying "I can't understand him" and rewinding the program) while the language is being spoken with the accent, and determine a level of difficulty that the user has in understanding the accent (e.g., a high level of difficulty or nine out of ten). The media guidance application may enable subtitles for a media asset based on the level of difficulty. At a second point in time later than the first point in time, the media guidance application may determine that the user does not perform the user interactions again, and update the level of difficulty to a level of difficulty lower than the original level of difficulty (e.g., a low level of difficulty, or a two out of ten), as the user may now understand the accent. Based on the new level of difficulty, the media guidance application may not enable subtitles.

Figure 1:
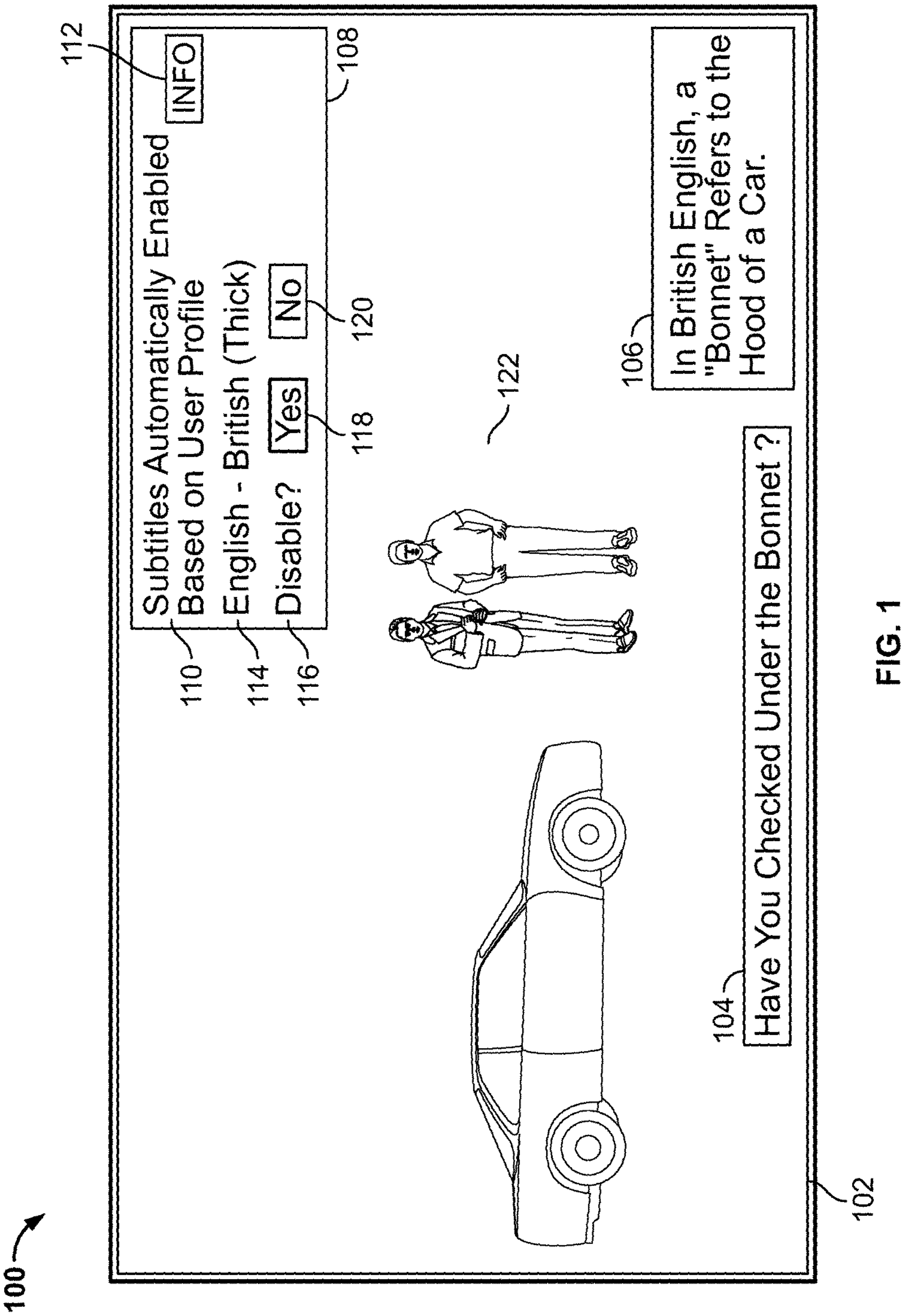
FIG. 1 shows an illustrative display screen where subtitles have been automatically enabled based on a user profile, in accordance with some embodiments of the disclosure.

FIG. 1 shows an illustrative display screen where subtitles have been automatically enabled based on a user profile, in accordance with some embodiments of the disclosure. For example, the media guidance application may generate (e.g., via control circuitry 504 (FIG. 5) below) for display on display screen 102 (e.g., display 512 (FIG. 5) below on any user equipment of FIG. 6) subtitles 104 and pop-up 106 based on a user profile of a user viewing media asset 122. The media guidance application may generate for display subtitles 104 and pop-up 106 based on determining that the user profile indicates that the user may have difficulty understanding the accent being spoken in media asset 122.

In some embodiments, the media guidance application may additionally generate for display pop-up 108 on display 102, which may include notification 110, accent indication 114, and disable option 116. Notification 110 may notify the user that subtitles were automatically enabled based on the user's profile, and the media guidance application may allow the user to access more information about the user profile or about automatically enablement of subtitles using INFO button 112. Furthermore, the media guidance application may generate for display accent indication 114, which may indicate a language spoken in media asset 122 (e.g., English), what accent the language is being spoken in (e.g., a British accent), and what at what accent level the language is being spoken (e.g., "Thick" to indicate a thick accent). The media guidance application may also generate for display disable option 116 in pop-up 108. This may allow the user to disable subtitles 104 by selecting option 118, or have the subtitles remain on the screen by selecting option 120.

In some embodiments, the media guidance application may detect, in order to determine whether to automatically generate for display subtitles 104 and pop-up 106, that media asset 122 includes a language that the user can understand is being spoken in an accent (e.g., English, as displayed in accent indication 114). To detect what language is being spoken, in some embodiments, the media guidance application may receive data packets containing metadata from a media guidance data source (e.g., media guidance data source 618 (FIG. 6) below) that indicates one or more languages included in media asset 122, and during what portions of the media asset those languages are being spoken. The media guidance application may receive, in the data packets, a data structure that indicates the one or more languages and indicates when the languages are being spoken. For example, the media guidance application may extract, by executing an SQL script utilizing the declarative "Select" command, information sufficient to determine that all but the final five minutes of media asset 122, which may be one-hundred and five minutes long, is spoken in English, and that the final five minutes of media asset 122 is spoken in French. The media guidance application may therefore detect that English is being spoken for the first one-hundred minute of media asset 122. In some embodiments, the metadata may indicate that the source of media asset 122 (e.g., media content source 616 (FIG. 6) below) transmits media assets in only a single language, for example, in Spanish. Based on determining that the source transmits media assets in Spanish, the media guidance application may determine that Spanish is being spoken during playback of media asset 122.

In some embodiments, the media guidance application may access user settings to detect what language is being spoken. For example, media guidance application may generate for display media asset 122 from a digital versatile disc (DVD). The media guidance application may receive a user selection to playback media asset 122 from the DVD in English, and may therefore detect that media asset 122 includes audio in English. In some embodiments, the user may activate a global setting to receive all media assets in one language. For example, the media guidance application may retrieve, from the user profile of the user, a data structure indicating a global setting to play media assets in English. Based on retrieving the data structure, the media guidance application may determine that media asset 122 includes audio in English.

The media guidance application may detect what language is being spoken using natural language processing. In some embodiments, the media guidance application may detect words or vocal patterns in the audio of media asset 122. The media guidance application may transmit to a remote server (e.g., media guidance data source 618 (FIG. 6) below) data packets containing the detected words or vocal patterns. The media guidance application may receive, from the remote server, data packets containing an indication of the language being spoken in media asset 122. In some embodiments, the media guidance application may access a database (e.g., media guidance data source 618 (FIG. 6) below), and retrieve a data structure associating the detected words or the detected vocal patterns with one or more languages. The media guidance application may compare the detected words or detected vocal patterns with the data structure to determine the language spoken in media asset 122.

In order to determine that the detected language is a language that the user understands, the media guidance application may retrieve a first data structure from the user profile and extract, by executing an SQL script utilizing the declarative "Select" command, a list indicating the languages that the user understands. For example, the list may indicate that the user understands English and Spanish. The media guidance application may then compare, based on determining that media asset 122 includes English, English to the one or more languages in the list to determine that English is included in the list of one or more languages. More details on the first data structure and the list indicating the languages that the user understands are presented in relation to FIG. 2.

The media guidance application may detect that media asset 122 includes the language spoken in an accent (e.g., a British accent, as displayed in accent indication 114). In some embodiments, the media guidance application may also determine an accent level with which the given language is spoken in the media asset (e.g., thick, as displayed in accent indication 114). The accent level may indicate how slight or how heavy the accent is. For example, the accent level may indicate that the accent level is ten on a scale of one to twenty, or that it the accent is between a slight and a thick accent. In another illustrative example, the accent level may be "very slight," "slight," "average," "above average," "thick" or "very thick." Note that "accent," as used herein, is any speech pattern associated with a particular locality, social group, economic group, socioeconomic group, dialect, and/or time period.

In some embodiments, the media guidance application may detect that media asset 122 includes the given language spoken with the accent at a certain accent level using natural language processing. For example, the media guidance application may detect certain audio signatures, such as certain words, the frequency of certain words, certain phrases, the speed the language is being spoken in, certain vowel sounds, certain combinations of vowel sounds, intonations of words, vocal patterns during sentences, certain pronunciation of words, vocal pitch, volume of speech, liaisons, or any other suitable audio signature appropriate for determining an accent in order to detect the accent. The media guidance application retrieve, from a remote source (e.g., media guidance data source 618 (FIG. 6) below) a data structure associating audio signatures with accents and accent levels. As an illustrative example, the media guidance application may monitor the audio for certain keywords. The media guidance application may then retrieve, from a remote source, a data structure associating certain words with certain accents. For example, the word "mate" may be associated with an Australian accent, and the word "bonnet" may be associated with a British accent. The media guidance application may detect the word "bonnet" in media asset 122, and may compare the word "bonnet" to the data structure associating certain words with certain accents to determine that "bonnet" is associated with a British accent. Based on the comparison, the media guidance application may determine that media asset 122 contains English spoken with a British accent. The media guidance application may determine what words are used based on analyzing a data file containing subtitles 104.

Furthermore, the media guidance application may compare certain audio signatures to the data structure to determine the accent level. For example, the media guidance application may detect a number of raised vowels in the audio signature of media asset 122. The media guidance application may compare this to the data structure to determine that raised vowels are associated with a thick British accent, and therefore determine that the accent level is "thick" or two on a scale of one to twenty, twenty representing a very slight accent. In another illustrative example, the media guidance application may detect that the language is being spoken very slowly. The media guidance application may compare this to the data structure to determine that slow speech is associated with a slight British accent.

In some embodiments, the media guidance application may detect that media asset 122 includes the given language spoken with the accent using metadata. In some embodiments, the media guidance application may detect that media asset 122 includes the given language spoken with the accent using metadata by receiving, from a media source (e.g., media guidance data source 618 or media content source 616 (FIG. 6) below), a data structure indicating media asset 122, a first portion of media asset 122, that the given language is being spoken with the accent during the first portion of media asset 122, and the accent level. For example, the media guidance application may determine that the data structure indicates that for the first one-hundred minutes of media asset 122, English is being spoken with a British accent, and an accent level of ten. The media guidance application may extract, from the data structure, the indication that English is being spoken with a British accent in media asset 122 to determine that media asset 122 includes the given language spoken with the accent. Note that the media guidance application may create the data structure by receiving input from metadata tagging experts, directors, and/or writers or by analyzing the script of the movie to determine writer's notes regarding accent usage.

In some embodiments, the media guidance application may detect that media asset 122 includes the given language spoken with the accent using metadata by receiving, from a media source (e.g. media content source 616 or media guidance data source 618 (FIG. 6) below), media asset 122 and a first data structure indicating a first portion of media asset 122 during which a specific actor appears. For example, the first data structure may indicate media asset 122, a first portion of media asset 122, and that the specific actor appears during the first portion. For example, the first data structure may indicate that, between one minute from the beginning of media asset 122 and five minutes from the beginning of media asset 122, the actor Maggie Smith appears. The media guidance application may determine the first data structure indicating the first portion of media asset 122 during with the specific actor appears by analyzing a received script for media asset 122 or by receiving input from metadata tagging experts, directors, and/or writers. In some embodiments, the media guidance application may determine the specific actor using facial recognition software.

In some embodiments, the media guidance application may receive, from the remote source, a second data structure associating the specific actor with the accent and the accent level. For example, the second data structure may indicate the specific actor, that the actor speaks with the accent, and that the actor speaks with the accent level. For example, the second data structure may indicate that Maggie Smith speaks English with a British accent and has an accent level of ten. The media guidance application may determine, based on the two data structures, that between one minute and five minutes of media asset 122, media asset 122 has audio that contains English spoken with a British accent at an accent level of ten. The media guidance application may determine the second data structure associating the specific actor with the accent and the accent level based on natural language processing, by receiving input from an operator or metadata expert, or by searching the Internet for indications that the specific actor speaks with the accent at the accent level.

In some embodiments, the second data structure associating the specific actor with the accent and the accent level may also indicate a plurality of time periods during which the actor had different accents or different accent levels for the same accent. For example, the media guidance application may receive the second data structure, which may indicate the specific actor, a plurality of time periods, and an accent and an accent level associated with each of the time periods. As an illustrative example, the second data structure may indicate that Maggie Smith spoke English with a British accent with an accent level of five from 1956 to 1990, spoke English with a British accent with an accent level of ten from 1991 to 2002, spoke English with a British accent with an accent level of fifteen from 2003 to 2011, and spoke with an American accent and a British accent with an accent level of nineteen for each from 2012 to the present. The media guidance application may receive, from the media source (e.g., media content source 616 or media guidance data source 618 (FIG. 6) below), an indication of the release date of media asset 122. For example, the media guidance application may receive an indication that media asset 122 was been released in 2001. The media guidance application may compare the year media asset 122 was released (e.g., 2001) to the start and end dates of each time period in the second data structure to determine that, in media asset 122, Maggie Smith spoke English in a British accent with an accent level of ten, and therefore detect that media asset 122 includes the language spoken with the accent with an accent level of ten.

In some embodiments, the media guidance application may determine the time periods and the accent and accent level associated with those time periods in the second data structure associating the specific actor with the accent based on inputs from an operator or a metadata expert. In some embodiments, the media guidance application may determine the time periods and associated data based on crowd-sourced data. In order to determine the time periods based on crowdsourced data, the media guidance application may determine what user interactions are performed while the specific actor is speaking during a media asset. Based on the user interactions and a year the media asset was released, the media guidance application may determine a difficulty users had in understanding the specific actor during the year. The media guidance application may perform this process for a plurality of media assets that contain the specific actor released during different years to determine the time periods in the second data structure and the accent and accent level associated with the time periods.

For example, the media guidance application may receive a usage log from a user indicating a period of time, and a media asset the user watched during the period of time. The media guidance application may determine, based on a data structure (e.g., received from media guidance data source 618 (FIG. 6) below), similar to the data structure indicating the first portion of media asset 122 during which the specific actor appears, a period of time during which the specific actor appeared. For example, the media guidance application may determine that the user watched "Hook" from 5:30 PM to 7:00 PM on Apr. 29, 2014. Based on a received data structure, the media guidance application may determine that Maggie Smith appeared in "Hook" from ten minutes from the beginning of "Hook" to twenty minutes from the beginning of "Hook." Therefore, the media guidance application may determine that Maggie Smith was displayed to the user from 5:40 PM to 5:50 PM on Apr. 29, 2014, based on the received data structure and the usage log.

The media guidance application may also receive a data log from user equipment associated with the user indicating a first point in time and a plurality of user interactions. More details concerning the data logs will be presented below in relation to FIG. 2. For example, the media guidance application may receive a data log that includes a data field indicating the first point in time and a data field indicating the user interactions. The media guidance may extract, by executing an SQL script utilizing the declarative "Select" command, the user interactions and the first point in time and determine that the user said "What?" and paused "Hook" at 5:45 PM on Apr. 29, 2014.

In some embodiments, the media guidance application may calculate a value, based on the user interactions, and associate that value with a user specific level of difficulty. The user specific level of difficulty may be indicative of a measure difficulty that the user encounters in understanding the given language when spoken with the accent. More details on the process by which the media guidance application calculates the value and associates the value with the user specific level of difficulty are provided below in relation to FIG. 2. For example, the media guidance application may determine, based on the user interactions of the user saying "What?" and pausing "Hook," that the value is ten, and the media guidance application may associate that value with a user specific level of difficulty.

In some embodiments, the media guidance application may determine that the user specific level of difficulty is associated with the specific actor by comparing the first point in time to the period of time the specific actor appeared. For example, the media guidance application may determine that the user specific level of difficulty was fifteen at 5:45 PM on Apr. 29, 2014 by extracting, the relevant data from the data log by executing an SQL script utilizing the declarative "Select" command. The media guidance application may compare this the determined period of time (e.g., from 5:40 PM to 5:50 PM on Apr. 29, 2014) that Maggie Smith was displayed to the user to determine that the first point in time is included in the period of time, and thus that the user specific level of difficulty of ten is associated with Maggie Smith.

The media guidance application may receive, from a remote source (e.g., media guidance data source 618 or media guidance content source 616), data indicating what year the media asset was released. For example, the media guidance application may receive a data structure indicating that "Hook" was released in 2001. The media guidance application may proceed to associate the user specific level of difficulty with an accent level. The user specific level of difficulty may be equal to the accent level, or an algorithm may be used to determine the accent level based on the user specific level of difficulty. The media guidance application may then associate the accent level with the year the media asset was released and with the specific actor in a first crowdsourced data structure. For example, the media guidance application may create a first crowdsourced data structure indicating the year the media asset was released, the specific actor, and the accent level. As an illustrative example, the first data crowdsourced structure may indicate that in 2001, Maggie Smith was associated with an accent level of ten.

The media guidance application may create a second crowdsourced data structure indicating a second year that a second media asset was released that contained the specific actor, the specific actor, and a second accent level determined based on second user interactions of a second user. The media guidance application may determine the various components of the second crowdsourced data structure in a manner similar to that described above in relation to the similar components in the first crowdsourced data structure. For example, the second data structure may indicate that in 2007, Maggie Smith was associated with an accent level of fifteen. While two users are described here, one of ordinary skill in the art would understand that a plurality of crowd-sourced data structures similar to the first and second crowdsourced data structures described above could be created by the media guidance application for a plurality of users, the values therein determined by the media guidance application in a similar manner to that described above. In some embodiments, the plurality of crowdsourced data structures may include an indication of the geographic region of the plurality of users, and the media guidance application may only include a subset of the plurality of crowdsourced data structures in the determination of the second data structure indicating a plurality of time periods during which the actor had different accents or different accent levels for the same accent the second data structure if the geographic indication is not matched with the accent of the actor.

The media guidance application may determine, based on the first and second crowdsourced data structures described above, which may, in some embodiments, have come from users who are not in the geographic region associated with the accent, the second data structure indicating a plurality of time periods during which the actor had different accents or different accent levels for the same accent (e.g., indicating that Maggie Smith spoke English with a British accent with an accent level of five from 1956 to 1990, spoke English with a British accent with an accent level of ten from 1991 to 2002, spoke English with a British accent with an accent level of fifteen from 2003 to 2011, and spoke with an American accent and a British accent with an accent level of nineteen for each from 2012 to the present).

In some embodiments, media guidance application may receive multiple metadata files usable to detect the presence of an accent in media asset 122. For example, the media guidance application may receive the data structure indicating media asset 122, a first portion of media asset 122, that the given language is being spoken with the accent during the first portion of media asset 122, and the accent level, and receive the first data structure indicating the portion of media asset 122 during with the specific actor appears in conjunction with the second data structure associating the specific actor with the accent and the accent level. If the metadata files have conflicting information, the media guidance application may determine which metadata file is more accurate. For example, the media guidance application may determine that the data structure indicating media asset 122, a first portion of media asset 122, that the given language is being spoken with the accent during the first portion of media asset 122, and the accent level, is more accurate than the actor-specific data structures, and determine to use the information provided in the data structure indicating media asset 122, a first portion of media asset 122, that the given language is being spoken with the accent during the first portion of media asset 122, and the accent level, as a basis for determine the accent in media asset 122. This may allow, for example, a metadata expert to tag an actor that doesn't normally have an accent (e.g., Tom Cruise) as having an accent (e.g., a Russian accent in "Mission Impossible") at a certain accent level (e.g., sixteen), despite the actor not normally having an accent.

With continued reference to FIG. 1, the media guidance application may generate (e.g., via control circuitry 504 (FIG. 5) below) for display on display screen 102 (e.g., display 512 (FIG. 5) below on any user equipment of FIG. 6) subtitles 104 and pop-up 106 based on the user profile of the user viewing media asset 122. For example, after detecting that media asset 122 includes English spoken with a British accent, and in some embodiment, the accent level of the accent (e.g., ten), the media guidance application may retrieve a data structure, from the user profile, indicating a user specific level of difficulty for the user, and extract, by executing an SQL script utilizing the declarative "Select" command, the user specific level of difficulty for the user from the data structure. For example, the media guidance application may send a query for the second data structure, and receive the second data structure from the user profile. In some embodiments, the media guidance application may extract, by executing an SQL script utilizing the declarative "Select" command, the user specific level of difficulty. For example, the media guidance application may determine that the user specific level of difficulty is twenty. More details about the data structure indicating the user specific level of difficulty are presented below in reference to FIG. 2.

In some embodiments, the media guidance application may automatically generate for display subtitles 104 for media asset 122 based on the extracted user specific level of difficulty. In some embodiments, the media guidance application may compare the user specific level of difficulty to a threshold level of difficulty to determine whether to automatically generate subtitles 104. For example, the media guidance application may determine that the threshold level of difficulty may be eleven, and that the user specific level of difficulty is twenty, and based on determining that the user specific level of difficulty is greater than the threshold level of difficulty, the media guidance application may generate for display subtitles 104 for media asset 122. As another illustrative example, the media guidance application may determine that the threshold level of difficulty may be eleven, and that the user specific level of difficulty is six, and based on determining that the user specific level of difficulty is less than the threshold level of difficulty, the media guidance application may not generate for display subtitles 104 for media asset 122.

In some embodiments, the media guidance application may compare the user specific level of difficulty to the accent level (e.g., ten) to determine whether to automatically generate subtitles 104. In some embodiments, the threshold level of difficulty may be the accent level or may be inversely correlated to the accent level. For example, the media guidance application may determine that the accent level in media asset 122 may be ten as described above, that the user specific level of difficulty is twenty, and based on determining that the user specific level of difficulty is greater than the accent level, the media guidance application may generate for display subtitles 104 for media asset 122. In some embodiments, the media guidance application may automatically generate subtitles 104 during the first portion of media asset 122 indicated in the metadata files described above that allow the media guidance application to determine the first portion of media asset 122 where an accent with a specific accent level is present. For example, the media guidance application may enable subtitles 104 at one minute from the beginning of media asset 122 and disable subtitles 104 at five minutes of media asset 122.

In some embodiments, the media guidance application may automatically enable subtitles 104 based on two users' user specific level of difficulty. In some embodiments, the media guidance application may detect that a first and second user are watching media asset 122 simultaneously. For example, the media guidance application may use facial recognition to determine that Bob and Linda are watching media asset 122. In some embodiments, the media guidance application may request that the viewer input who is watching media asset 122 to detect who is watching media asset 122.

The media guidance application may retrieve, based on detecting the second user, a data structure from a user profile of the second user indicating the second user's user specific level of difficulty. The media guidance may retrieve the data structure indicating the second user's user specific level of difficulty by sending a query for the data structure indicating the second user's user specific level and receiving the data structure indicating the second user's user specific level from the user profile. In some embodiments, the media guidance application may extract, from the data structure indicating the second user's user specific level, the second user's user specific level of difficulty. For example, the media guidance application may extract, by executing an SQL script utilizing the declarative "Select" command, the second user's user specific level of difficulty. For example, Linda's user specific level of difficulty may be four. The media guidance application may retrieve, based on detecting the first user, a data structure indicating the first user's user specific level of difficulty, and extract the first user's user specific level of difficulty. For example, the media guidance application may determine that Bob's user specific level of difficulty is twenty.

In some embodiments, the media guidance application may determine the threshold level of difficulty for generating for display subtitles 104. For example, the media guidance application may determine that the threshold level of difficulty is eleven. In some embodiments, the media guidance application may determine that at least one of the first user's user specific level of difficulty and the second user's user specific level of difficulty exceeds the threshold level of difficulty. For example, the media guidance application may compare Bob's user specific level of difficulty, which may be twenty, and Linda's user specific level of difficulty, which may be four, to the threshold level of difficulty, which may be eleven, to determine that Bob's user specific level of difficulty exceeds the threshold level of difficulty.

In some embodiments, the media guidance application may automatically generate for display subtitles 104 for media asset 122 based on determining that at least one of the first user's user specific level of difficulty and the second user's user specific level of difficulty exceeds the threshold level of difficulty. For example, the media guidance the media guidance application may generate for display subtitles 104 for media asset 122 based on determining that Bob's user specific level of difficulty exceeds the threshold level of difficulty, even though Linda's user specific level of difficulty does not exceed the threshold level of difficulty.

In some embodiments, the media guidance application may generate for display pop-up 106 in addition to subtitles 104. Pop-up 106 may be used to define a word or give alternate words to words used in the audio of media asset 122. Pop-up 106 is shown as separate from subtitles 104 for simplicity, and may be integrated with or separate from subtitles 104. The media guidance application may receive the information needed to populate pop-up 106 when receiving the subtitles, may receive it based on searching a dictionary of dialects, may search the Internet for an indication of alternate words or definitions of the word, may receive an indication from a remote source (e.g., media guidance data source 516 (FIG. 5) below), or may receive or determine the information needed to populate pop-up 106 in any suitable manner. In some embodiments, the media guidance application may cause the relevant word to be highlighted in the subtitles 104. For example, the media guidance application may cause the word "bonnet" to be highlighted in subtitles 104.

The media guidance application may enable pop-up 106 based on determining that the user specific level of difficulty exceeds a word-specific threshold level of difficulty. In some embodiments, the word-specific threshold level of difficulty may be the same as the threshold level of difficulty described above, may be a function of the threshold level of difficulty, or may be an unrelated to the threshold level of difficulty. In some embodiments, the word-specific level of difficulty may be a word-specific accent level. For example, the word "bonnet" may have a word-specific accent level of five, as most users may not understand the word "bonnet" as used in English when spoken with a British accent. The media guidance application may determine that the user specific level of difficulty is greater than the word-specific accent level. For example, the media guidance application may determine that the user specific level of difficulty in relation to English spoken with a British accent of twenty is greater than the word specific accent level of five, and, in response, generate for display pop-up 106.

The media guidance application may also determine that a word has a temporal-specific accent level. For example, it was common in the 1950s to refer to money as "bread." A user watching a film in 2017 and set in the 1950s or made in the 1950s may not understand that "bread" is used to refer to money. The media guidance application may determine the date the movie was released, or the temporal setting of the movie, based on data received from a remote source (e.g., media guidance data source 618 (FIG. 6) below).

If the media guidance application detects the use of a temporal word, the media guidance application may determine the temporal-specific accent level by retrieving, from a remote source (e.g., media guidance data source 618 (FIG. 6) below) a temporal data structure associating temporal words with temporal-specific accent levels. The media guidance application may determine the temporal data structure by analyzing common word usage in media assets, analyzing online posts, receiving metadata expert tags, or analyzing any other published written or spoken word. If the media guidance application determines that a word has become less common, or has been used differently at different times, then the media guidance application may add the word to the temporal data structure, and assign a temporal-specific accent level based on how much less common or how differently the word is being used. The temporal-specific accent level may decrease (or indicate that the word is harder to understand) as a function of time. For example, users watching a media asset using the term "bread" to mean money in the 1960s are very likely to understand the meaning of "bread." However, those same users watching in the 2000s are less likely to understand the meaning of "bread." For example, the media guidance application may have assigned "bread" a temporal-specific accent level of sixteen on a scale of one to twenty (twenty indicating no trouble in understanding) in the 1960s. The media guidance application may update the temporal-specific accent level of "bread" to five in the 2000s.

The media guidance application may access a user specific temporal level of difficulty, which may indicate how much the user understands temporal accents or temporal slang. The media guidance application may determine the user specific temporal level of difficulty based on a determined age of the user. In response to determining that that the user specific temporal level of difficulty is greater than the temporal-specific accent level, the media guidance application may enable pop-up 106 and therein indicate that "bread," in 1950s slang, referred to money.

In some embodiments, the media guidance application may generate for display pop-up 108 any time the media guidance application automatically generates for display pop-up 106 or subtitles 104. In some embodiments, the media guidance application may only generate for display pop-up 108 the first time subtitles 104 or pop-up 106 are automatically generated for display, or the first time subtitles 104 or pop-up 106 are automatically generated for display for a particular language spoken with a particular accent. In some embodiments, the media guidance application may generate for display pop-up 108 with notification 110, INFO button 112, accent indication 114, disable option 116, option 118, and option 120, or with any subset thereof.

The media guidance application may include notification 110 in pop-up 108 to notify the user that subtitles 104 or pop-up 106 were automatically enabled based on the user's profile. The media guidance application may receive a user selection of INFO button 112 by a user selection of INFO button 112 or by the user pressing the "INFO" key on their remote control (e.g., user input interface 510 (FIG. 5) below). Selection of INFO button 112 may cause the media guidance application to generate for display menu 204 of FIG. 2 below, or to display an information menu about automatic subtitles.

The media guidance application may include accent indication 114 in pop-up 108 to indicate what language is being spoken and the accent in which it is being spoken, and the accent level of the accent. For example, accent notification may indicate that English is being spoken with a British accent, with a "thick" accent level. The media guidance application may determine accent indication 114 as described above.

The media guidance application may include disable option 116 to allow the user to disable subtitles 104 or pop-up 106. For example, the user may decide that they can understand the accent, or that they prefer to view media asset 122 without subtitles 104 or pop-up 106. The media guidance application may receive a user selection of option 118 to disable subtitles 104, and may thereafter no longer display subtitles 104. The media guidance application may receive a user selection of option 120 to not disable subtitles 104, and thereafter persist subtitles 104 according to the method described above. The media guidance application may stop generating for display pop-up 108 after a predetermined time period, or only after INFO button 112, option 118, or option 120 are selected.

Figure 2:
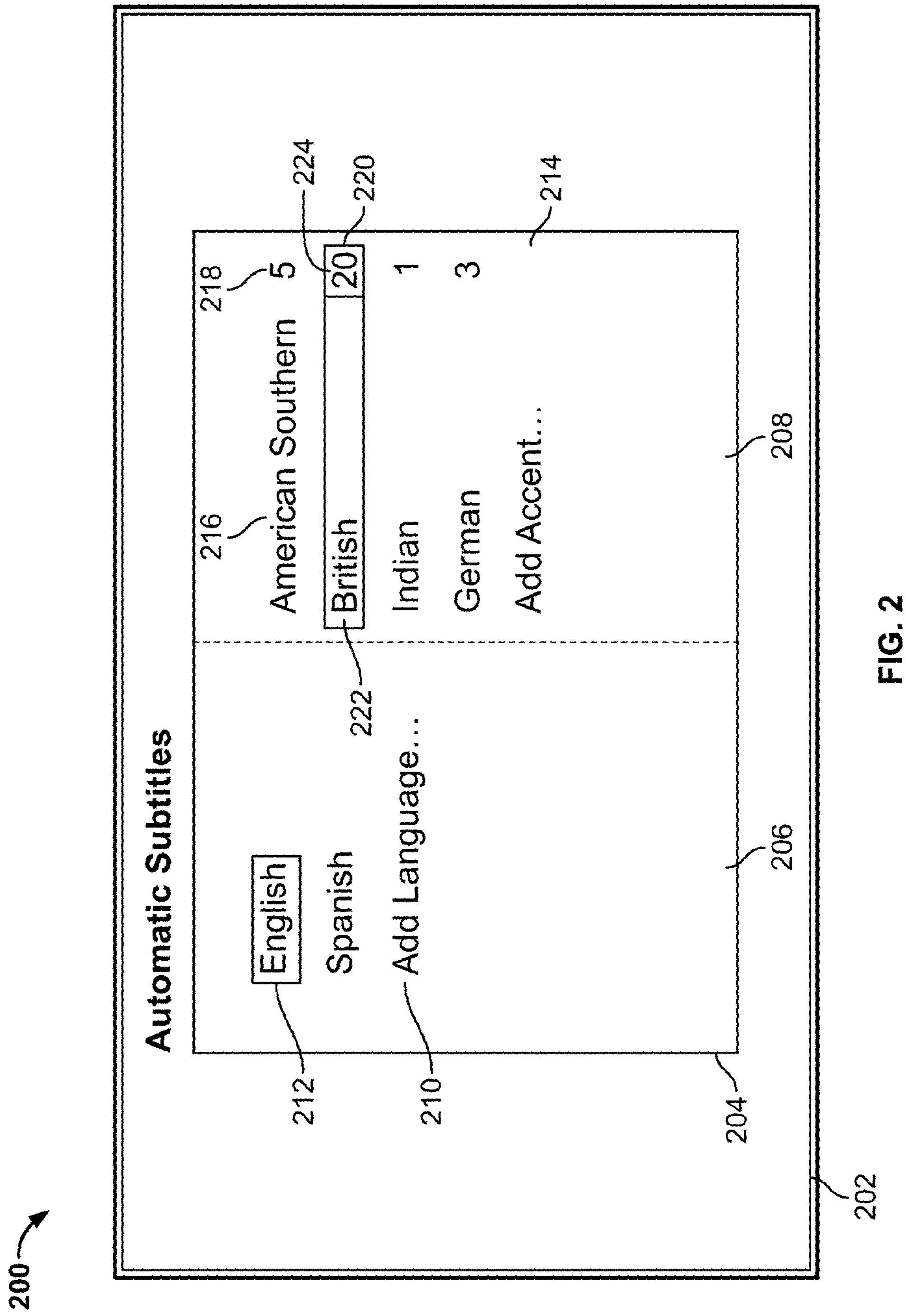
FIG. 2 shows an illustrative display screen for inputting or viewing user preferences referenced when automatically enabling subtitles, in accordance with some embodiments of the disclosure.

FIG. 2 shows an illustrative display screen for inputting or viewing user preferences referenced when automatically enabling subtitles, in accordance with some embodiments of the disclosure. For example, the media guidance application may generate (e.g., via control circuitry 504 (FIG. 5) below) for display on display screen 202 (e.g., display 512 (FIG. 5) below on any user equipment of FIG. 6) menu 204. Menu 204 may include languages list 206 and accent list 208.

Languages list 206 may be a graphical display indicative of the languages that the user can understand and may give the user the option to add additional languages to the list. For example, languages list 206 may include add language option 210, and language indicator 212. The media guidance application may receive navigation commands from the user to control language indicator 212. In some embodiments, if the media guidance application receives navigation commands from the user that navigates language indicator 212 to one of the languages in languages list 206, and receives a selection of one of the languages, for example, "English," the media guidance application may generate for display accent list 208. In some embodiments, the media guidance application may automatically generate for display accent list 208 upon navigation to one of the languages in language list 206. The media guidance application may also receive a selection of add language option 210. The media guidance application may then generate for display a list of languages that a user can select for addition to languages list 206. In this way, the media guidance application may allow the user to manually curate languages list 206 and the list of languages the user understands.

In some embodiments, the media guidance application may store language list 206 in a user profile associated with the user by creating a first data structure indicating the list of one or more languages that a user understands. For example, media guidance application may create the list of one or more languages that the user understands in response to receiving a user selection of the add language option 210 and the user inputting languages. For example, the media guidance application may receive a user input indicating that the user understands the English and Spanish languages. The media guidance application may then create the first data structure that identifies the user profile and indicates that the user understands the English and Spanish languages.

In some embodiments, the media guidance application may determine language list 206 automatically. For example, the media guidance application may determine language list 206 automatically by receiving an input from the user indicating their geographic region, or may automatically determine the user's geographic region based on GPS, product registration information, triangulation, or by using any other appropriate locating method. The media guidance application may retrieve a geographic data structure that indicates what languages users in different geographic regions typically understand, and compare the geographic region to the geographic data structure to determine what languages users in the geographic region typically understand. The media guidance application may update language list 206 with the determined languages. For example, the media guidance application may determine that the user lives in Tijuana, and that a user living in Tijuana may be likely to understand Spanish and English, and update language list 206 accordingly.

In some embodiments, the media guidance application may determine language list 206 automatically by analyzing an existing user profile, for example, a social media profile, to determine what languages the user speaks. For example, the user may post in Spanish on Twitter and post in English on Facebook. In response, the media guidance application may determine that the user understands English and Spanish, and update language list 206 accordingly.

The media guidance application may additionally generate for display, in menu 204, accent list 208. Accent list may include add accent option 214, accents 216, user specific levels of difficulty 218, and accent indicator 220. Accent list 208 may include accents 216, which may be accents that the user has difficulty understanding when the language selected by language indicator 212 (e.g., English) is spoken with accents 216. Accents list 208 may additionally include user specific levels of difficulty 218, which may correspond to accents 216, and may be indicative of a measure difficulty that the user encounters in understanding the given language when spoken with the accent. For example, user specific levels of difficulty 218 may be five, twenty, eleven, and three for accents 216, American Southern, British, Indian, and German, respectively, and, in some embodiments, may be on a scale of one to twenty, twenty being the most difficult to understand. In some embodiments, user specific levels of difficulty 218 may be on a scale of "no difficulty understanding," "limited difficulty understanding," "average difficulty understanding," "somewhat difficult to understand," "very difficult to understand," and "no understanding" or any other qualitative scale of level of difficulty in understanding accents 216.

In some embodiments, the media guidance application may receive a user selection of accent 222 (e.g., a British accent) using accent indicator 220. In some embodiments, the media guidance application may receive a user selection of accent 222 and allow the user to input user specific level of difficulty 224 manually (e.g., to twenty). In some embodiments, the media guidance application may receive a user selection of add language option 214, and generate for display a list of accents that the user can chose to add to accents list 208. In this way, the media guidance application may allow the user to manually adjust his or her user profile and accents list 208.

In some embodiments, the media guidance application may determine accents 216 and user specific levels of difficulty 218 automatically. For example, the media guidance application may determine accent 222 and 224 by determining that a given language (e.g., English) in language list 206 is being spoken with accent 222 at a first point in time, similar to as described above in relation to FIG. 1 and detecting that media asset 122 includes English spoken in a British accent. The media guidance application may monitor user interactions (e.g., the user saying "I can't understand him" and rewinding the program) while the language is being spoken with accent 222, and determine user specific level of difficulty 224 based on the user interactions.

In some embodiments, in order to automatically determine accent 222 and user specific level of difficulty 224, the media guidance application may determine, at a first point in time, that a given language of the one or more languages in the language list 206 is being spoken with accent 224. For example, the media guidance application may generate for display episode 1 of season 1 of "Game of Thrones," entitled "Winter is Coming" on Apr. 17, 2016 at 8:30 PM. The media guidance application may determine that "Winter is Coming" includes audio with accent 222 as described above in relation to FIG. 1. In order to determine that the given language is included in the one or more languages in language list 206, the media guidance application may retrieve the first data structure from the user profile and extract, by executing an SQL script utilizing the declarative "Select" command, language list 206 indicating that the user understands English and Spanish from the first data structure. The media guidance application may then compare English to the one or more languages in language list 206 to determine that English is included in language list 206.

To continue to automatically determine accent 222 and user specific level of difficulty 224, in some embodiments, the media guidance application may detect a first plurality of user interactions of the user while the given language is being spoken with accent 222. In some embodiments, a respective one of the first plurality of user interactions may be at least one of a facial expression, rewinding a previous media asset, pausing the previous media asset, enabling subtitles, increasing the volume, a head movement, a user gesture, a vocal utterance, a user setting input, a user geographic input, a user demographic information input, a social media post, a user selection of INFO button 112 of FIG. 1, a user selection of option 118 of FIG. 1, and a user selection of option 120 of FIG. 1. For example, the media guidance application may detect that the user said "I can't understand him" and rewound "Winter is Coming" while the given language was being spoken with accent 222. These interactions may indicate that the user did not understand the dialogue in accent 222 in "Winter is Coming" and may have had to rewind "Winter is Coming" in order to hear the dialogue again, which may further indicate that the user does not understand English when it is spoken with accent 222.

In some embodiments, the media guidance application may store (e.g., in storage 508 (FIG. 5) below) a data log indicating the first point in time and the first plurality of user interactions in the user profile. For example, the media guidance application may create a data log that includes a data field indicating the first point in time, a data field indicating the user interactions, and a data filed identifying the user profile. The media guidance may input Apr. 17, 2016 at 8:30 PM into the data field indicating the first point in time and the user saying "I can't understand him" and rewinding the media asset into the data field indicating the user interactions. The media guidance application may proceed to store, in the user profile, the data log.

In some embodiments, the media guidance application may retrieve an information table (e.g. information table 1002 (FIG. 10) below), from a remote source, associating user interactions (e.g., user interactions column 1004 (FIG. 10) below) with values (e.g., values column 1006 (FIG. 10) below). For example, in order to retrieve the information table, the media guidance application may send a query to the remote source for the information table, and may receive, from the remote source, a data packet containing the information table. The values in the information table may represent a general level of difficulty, and the general level of difficulty might be indicative of a measure of difficulty a plurality of users have in understanding accents in audio content. For example, the information table may associate the user interaction of enabling subtitles for a media asset with a value of ten on a scale of one to ten, which may indicate that enabling subtitles for a media asset generally indicates that users have a very difficult time understanding an accent in the media asset. More details about the information table are presented below in relation to FIG. 10.

In some embodiments, the media guidance application may compare the first plurality of user interactions with the information table to determine a first plurality of values. Each of the first plurality of values may be associated with a respective one of the first plurality of user interactions. For example, the media guidance application may search the information table (e.g., search user interaction column 1004 (FIG. 10) below) for the user interaction of the user saying "I can't understand him." The media guidance application may then extract, from the information table (e.g., from values column 1006 (FIG. 10) below), the value associated with the user interaction of the user saying "I can't understand him," which may be ten on a scale of one to ten and store that value in a data structure. The media guidance application may then search the information table (e.g., search user interaction column 1004 (FIG. 10) below) again for the user interaction of rewinding the media asset, and determine (e.g., from values column 1006 (FIG. 10) below) that the value associated with rewinding the media asset may be a nine on the scale of one to ten. The media guidance application may append the new value to the data structure. More details about the information table are presented below in relation to FIG. 10.

In some embodiments, the media guidance application may calculate user specific level of difficulty 224 based on the first plurality of values. For example, the media guidance application may extract the two values (e.g., nine and ten) from the data structure and sum the numbers to determine user specific level of difficulty 224 to be nineteen. As another illustrative example, the media guidance application may determine an average of the first plurality of values, which may be nine and a half. As another illustrative example, the media guidance application may sum the first plurality of values, and may apply a maximum value to the sum. For example, the maximum value may be fifteen, and the media guidance application may determine that user specific level of difficulty 224 is fifteen because the sum of the first plurality of values (e.g., nineteen) exceeds the maximum value. As another illustrative example, the media guidance application may determine user specific level of difficulty 224 by calculating a sum of the first plurality of values and then multiplying the sum by the number of values in the first plurality of values. The media guidance application may determine that the sum is nineteen, and then multiply the sum by two because there were two values (e.g., nine and ten) to yield user specific level of difficulty 224 of thirty-eight.

In some embodiments, the media guidance application may include a geographic component when calculating user specific level of difficulty 224. In order to include the geographic component, the media guidance application may determine the geographic location of the user, for example, by using GPS to determine what zip code the user is in. For example, the media guidance application may determine that the user is located in the zip code 94010. Any measure of geographic location may be used, such as zip code, city, state, county, province, country, radius, continent, geographic region, or any other suitable indication of location.

In some embodiments, the media guidance may then retrieve a second information table associating the geographic location and accent 222 with an augmenting value. For example, to retrieve the second information table, the media guidance application may query the remote server for the information table, and receive a data packet including the second information table from the remote server. The second information table may be a matrix, where the rows are associated with a plurality of geographic locations, and where the columns are associated with a plurality of accents. The media guidance application may identify the row of the matrix that represents the zip code 94010, and identify the column of the matrix that represents accent 222. The cell that is in the identified row and the identified column may contain the augmenting value, which may be 1.053. The augmenting value may indicate how difficult it is, on average, for users in the geographic region to understand the accent: an augmenting value of 1.053 may indicate that the users in the 94010 zip code have an average difficulty understanding English when spoken with accent 222.

In some embodiments, the media guidance application may calculate the augmenting value by receiving, from a plurality of users located in the geographic location, a plurality of data logs indicating a second plurality of user interactions of the plurality of users detected while the given language was being spoken with accent 222 on user equipment associated with the plurality of users. For example, the plurality of data logs may be similar to the data log created for the user, and the user interactions may be similar to those described above in relation to the first plurality of user interactions. The media guidance application may compare the second plurality of user interactions with the information table to determine a second plurality of values similar to as described above in relation to comparing the first plurality of values to the information table to determine the first plurality of values. The media guidance may calculate the augmenting value based on the second plurality of values by, for example, calculating a sum of the second plurality of values and dividing the sum of the second plurality of values by an average sum for a plurality of geographic locations.

In some embodiments, the media guidance application may recalculate user specific level of difficulty 224 by combining the augmenting value and user specific level of difficulty 224. For example, the media guidance application may combine the augmenting value and user specific level of difficulty 224 by multiplying user specific level of difficulty 224 by the augmenting value: for example, the media guidance application may multiply user specific level of difficulty 224 of nineteen with the augmenting value of 1.053 to recalculate the first value as twenty.

In some embodiments, the media guidance application may then create a second data structure. The second data structure may associate user specific level of difficulty 224 with a user specific level of difficulty for accent 222. For example, the media guidance application may create a second data structure that has a data field indicating the user profile, a data field indicating the language, a data field indicating accent 222, and a data field indicative of user specific level of difficulty 224. As an illustrative example, the data field indicating the language may indicate the language English, the data field indicating the accent may indicate accent 222, and the data field indicative of the user specific level of difficulty may associate the value twenty with user specific level of difficulty 224. In some embodiments, the media guidance application may store the second data structure in the user profile.

The media guidance application may generate menu 204 based on the stored first data structure and the second data structure. For example, when the media guidance application receives a user selection of INFO button 112 of FIG. 1, the media guidance application may access the first data structure and extract, by executing an SQL script utilizing the declarative "Select" command, languages list 206 a generate for display a graphical representation of languages list 206. Upon a user selection of, for example, English from languages list 206, the media guidance application may access the second data structure and extract, by executing an SQL script utilizing the declarative "Select" command, accent 222 and user specific level of difficulty 224. In some embodiments, each accent of accent list 208 is represented by an individual data structure, and in some embodiments the second data structure may b include all of accents 216 in accent list 208.

In some embodiments, the media guidance application may receive a user selection of accent 222 using accent indicator 220. In some embodiments, the media guidance application may receive a user selection of accent 222 and allow the user to update user specific level of difficulty 224 manually (e.g., to twenty). In some embodiments, the media guidance application may automatically update user specific level of difficulty 224. For example, at a second point in time later than the first point in time, the media guidance application may determine that the user does not perform the first plurality of user interactions again, and update user specific level of difficulty 224, as the user may now better understand accent 222.

In some embodiments, the media guidance application may detect that the given language is being spoken with accent 222 at a second point in time after than the first point in time. For example, the media guidance application may generate for display episode 1 of season 1 of "Sherlock," entitled "A Study in Pink" on Oct. 17, 2016 at 8:30 PM. The media guidance application may determine that "A Study in Pink" contains audio in which actors are speaking in English with accent 222, as described in relation to detecting the accent in FIG. 1. In some embodiments, the media guidance application may retrieve the data log from the user profile based on detecting that the given language is being spoken with accent 222 at the second point in time. For example, the media guidance application may query the user profile for the data log in response to determining that "A Study in Pink" contains audio in which actors are speaking in English with accent 222. In response, the media guidance may receive the data log.

In some embodiments, the media guidance application may monitor user interactions of the user while the given language is being spoken with accent 222 at the second point in time to determine whether the first plurality of user interactions are being performed again while the given language is being spoken with accent 222. For example, in order to determine if the user is performing the first plurality of user interactions again at the second point in time, the media guidance application may extract, from the data log, the first plurality of user interactions. The media guidance application may monitor the user interactions to determine if the user says "I can't understand him" again or if they rewind "A Study in Pink" while English is being spoken with accent 222. In some embodiments, if the user does perform the first plurality of user interactions again, then the media guidance application may not update the user profile.

In some embodiments, based on determining that that first plurality of user interactions are not performed again, the media guidance application may update user specific level of difficulty 224 in the second data structure with a lower value. For example, the media guidance application may determine that the user didn't say "I can't understand him" while English is being spoken in accent 222 during "A Study in Pink," and didn't rewind the program. Based on this determination, the media guidance application may update user specific level of difficulty 224 in the second data structure by inputting a value of six into the data field indicative of user specific level of difficulty 224 in order to associate the value six with user specific level of difficulty 224, which may indicate that the user has little difficulty in understanding English when spoken with accent 222.

In some embodiments, the media guidance application may determine a second plurality of user interactions of the user while the given language is being spoken with accent 222. For example, the media guidance application may determine that the user paused "A Study in Pink" and cocked their head to one side while English was being spoken with accent 222 during "A Study in Pink." In some embodiments, the media guidance application may determine that the first plurality of interactions are not being performed again by comparing the second plurality of user interactions to the first plurality of user interactions. The media guidance application may determine that pausing the media asset and the user cocking their head to one side is not the same as the user saying "I can't understand him" and the user rewinding the media asset.

In some embodiments, the media guidance may calculate updated user specific level of difficulty 224. In some embodiments, in order to calculate updated user specific level of difficulty 224, the media guidance application may compare the second plurality of user interactions with the information table (e.g., information table 1002 (FIG. 10) below) to determine a second plurality of values and calculate updated user specific level of difficulty 224 based on the second plurality of values. For example, the media guidance application may search the information table (e.g., search user interactions column 1004 (FIG. 10) below) for the user interaction of the pausing the media asset. The media guidance application may then extract, from the information table (e.g., from values column 1006), the value associated with the user interaction of the user pausing the media asset, which may be three on a scale of one to ten and store that value in a data structure. The media guidance application may then search the information table (e.g., search user interactions column 1004 (FIG. 10) below) again for the user interaction of the user cocking their head to one side, and determine (e.g., from values column 1006) that the value associated with the user cocking their head to one side may be a two on the scale of one to ten. The media guidance application may append the new value to the data structure. The media guidance may then calculate updated user specific level of difficulty 224 by summing the two values (e.g., two and three) and then multiplying the sum by an augmenting factor determined as described above, which may be 1.2. The media guidance application may then determine that updated user specific level of difficulty 224 is six.

In some embodiments, the media guidance application may calculate updated user specific level of difficulty 224 using a decay function based on the elapsed time between the first point in time and the second point in time. The use of a decay function that shows how quickly the average user learns to understand an accent may be useful as it may be less computationally intensive to use a decay function rather than to determine the second plurality of user interactions and use the information table to determine the updated user specific level of difficulty 224.

In some embodiments, in order to calculate updated user specific level of difficulty 224, the media guidance application may extract, from the data log, the first point in time. For example, the media guidance application may extract Apr. 17, 2016 at 8:30 PM from the data log by executing an SQL script utilizing the declarative "Select" command. In some embodiments, the media guidance application may compare the first point in time to the second point in time to determine an elapsed time between the first point in time and the second point in time. For example, the media guidance application may subtract Apr. 17, 2016 at 8:30 PM from Oct. 17, 2016 at 8:30 PM to determine that the elapsed time is 183 days.

In some embodiments, the media guidance application may retrieve, from the remote source, a decay function. The media guidance may retrieve the decay function by querying the remote source for the decay function, and may receive a data packet containing the decay function from the remote source. The decay function may associate the elapsed time to user specific level of difficulty 224. For example, the decay function may be an exponential decay function. In some embodiments, the media guidance application may input the elapsed time and the first value for user specific level of difficulty 224 into the decay function to determine updated user specific level of difficulty 224. For example, the media guidance application may input the elapsed time of 183 days and the first value of twenty for user specific level of difficulty 224 into the decay function, and may determine that updated user specific level of difficulty 224 is six.

In some embodiments, the media guidance application may calculate updated user specific level of difficulty 224 using a decay function based on the number of media assets the user watched between the first point in time and the second point in time. The use of a decay function that shows how the user's understanding of an accent changes when they are exposed to the accent may be useful as it may be less computationally intensive to use a decay function rather than to determine the second plurality of user interactions and use the information table to determine updated user specific level of difficulty 224. While it may be more computationally intensive than using a decay function associating the elapsed time to the user specific level of difficulty 224, it may be more accurate to user a decay function associating the number of media assets to user specific level of difficulty 224.

In some embodiments, in order to calculate updated user specific level of difficulty 224, the media guidance application may monitor user usage of user equipment to determine a plurality of media assets that the user has watched. Each of the plurality of media assets contain audio with the given language spoken with accent 222. For example, the media guidance application may determine that the user watched two episodes of "Game of Thrones" using their set-top box, "Winter is Coming" on Apr. 17, 2016 at 8:30 PM and "The Kingsroad" on Apr. 18, 2016 at 4:00 PM, "Monty Python and the Holy Grail" on their computer on Aug. 5, 2016 at 10:00 AM, "Love Actually" on their tablet on Jul. 27, 2016 at 12:00 PM, and "A Study in Pink" on Oct. 17, 2016 at 8:00 PM on their mobile phone. In some embodiments, the media guidance application may store a usage log indicating the plurality of media assets and when the user watched each of the plurality of media assets. For example, the usage log may have a data field indicating each media asset, a data field indicating a plurality of points in time when the user watched each of the plurality of media assets, and a data field indicating the user profile. In some embodiments, the media guidance application may store the usage log in the user profile.

In some embodiments, the media guidance application may determine the number of media assets in the usage log that the user watched between the first point in time and the second point in time. For example, the media guidance application may extract the plurality of points in time and compare the plurality of points in time to the first point in time and the second point in time to determine how many of the plurality of points in time are between the first point in time and the second point in time. For example, the media guidance application may determine that the user watched "The Kingsroad," "Monty Python and the Holy Grail," and "Love Actually" between Apr. 17, 2016 at 8:30 PM and Oct. 17, 2016 at 8:30 PM, and thus, that number of media assets in the usage log that the user watched between the first point in time and the second point in time is three.

In some embodiments, the media guidance application may retrieve, from the remote source, a decay function relating the number of media assets to user specific level of difficulty 224. The media guidance may retrieve the decay function by querying the remote source for the decay function, and may receive a data packet containing the decay function from the remote source. The decay function may associate the number of media assets to user specific level of difficulty 224. For example, the decay function may be an exponential decay function. In some embodiments, the media guidance application may input the number of media assets and the first value of user specific level of difficulty 224 into the decay function to determine updated user specific level of difficulty 224. For example, the media guidance application may input the number of media assets of three and the first value of user specific level of difficulty 224 of twenty into the decay function, and may determine that updated user specific level of difficulty 224 is six.

In some embodiments, the media guidance application may determine the decay function relating the number of media assets to user specific level of difficulty 224. The media guidance application may do so by determining an average decay function for other users. For example, to determine the decay function, the media guidance application may receive, at the remote source, a second data log and a third data log from user equipment associated with a second user. The data logs may be similar to the data log for the user described above. The second data log may indicate a third point in time and a second plurality of user interactions that occurred while the user equipment associated with the second user generated for playback audio with the given language spoken in accent 222. The third data log may indicate a fourth point in time and a third plurality of user interactions that occurred while the user equipment associated with the second user generated for playback audio with the given language spoken in accent 222. For example, the second data log may indicate that the second user said "What?" and enabled subtitles on Mar. 1, 2015 at 7:00 AM and the third data log may indicate that the second user raised the volume of the TV and put a hand to their ear on Jun. 25, 2015 at 5:45 PM.

In some embodiments, the media guidance application may continue to determine the decay function relating the number of media assets to user specific level of difficulty 224 by comparing the second plurality of user interactions and the third plurality of user interactions to the information table (e.g., information table 1002 (FIG. 10) below) to determine a second plurality of values and a third plurality of values respectively. This may be done in a similar manner as comparing the first plurality of user interactions to the information table to determine the first plurality of values. For example, the media guidance application may determine that the second plurality of values are 7 and 10, associated with the user saying "What?" and enabling subtitles, respectively. The media guidance application may determine that the third plurality of values are 5 and 6, associated with the user raising the volume and putting a hand to their ear, respectively. In some embodiments, the media guidance application may determine a third value based on the second plurality of values and a fourth value based on the third plurality of values in a similar way as described above in determining the first value based on the first plurality of values. For example, the media guidance application may determine that the third value is 17, and may determine that the fourth value is 11.

In some embodiments, the media guidance application may receive, at the remote source, a second usage log indicating a second plurality of media assets that each contain audio with the given language spoken in accent 222. The second usage log may be similar to the usage log for the user as described above. The second usage log may indicate that the second user watched "A Study in Pink" on Mar. 1, 2015 at 7:00 AM, "Four Weddings and a Funeral" on May 10, 2015 at 2:00 PM, and episode 1 of season 5 of "Doctor Who," entitled "The Eleventh Hour," on Jun. 25, 2015 at 5:45 PM. In some embodiments, the media guidance application may determine a second number of media assets in the second usage log that the second user watched between the third point in time and the fourth point in time. For example, the media guidance application may do so in a similar manner as described above in relation to determining the number of media assets the user watched between the first point in time and the second point in time. For example, the media guidance application may determine that the user watched one media asset between Mar. 1, 2015 at 7:00 AM and Jun. 25, 2015 at 5:45 PM.

In some embodiments, the media guidance application may determine the decay function relating the number of media assets to user specific level of difficulty 224 based on the calculated third value, the calculated forth value, and the second number of media assets. For example, the media guidance application may determine an exponential decay function using 17 for the third value, 11 for the fourth value, and 1 for the number of media assets.

In some embodiments, the media guidance application may determine the decay function relating the elapsed time to user specific level of difficulty 224. The media guidance application may do so by determining an average decay function for other users, in a similar manner as described above in relation to the media guidance application determining the decay function relating the number of media assets to user specific level of difficulty 224.

In some embodiments, the media guidance application may determine and update any or all of user specific levels of difficulty 218 and accents 216 in a similar manner as described above in relation to accent 222 and user specific level of difficulty 224.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 3:
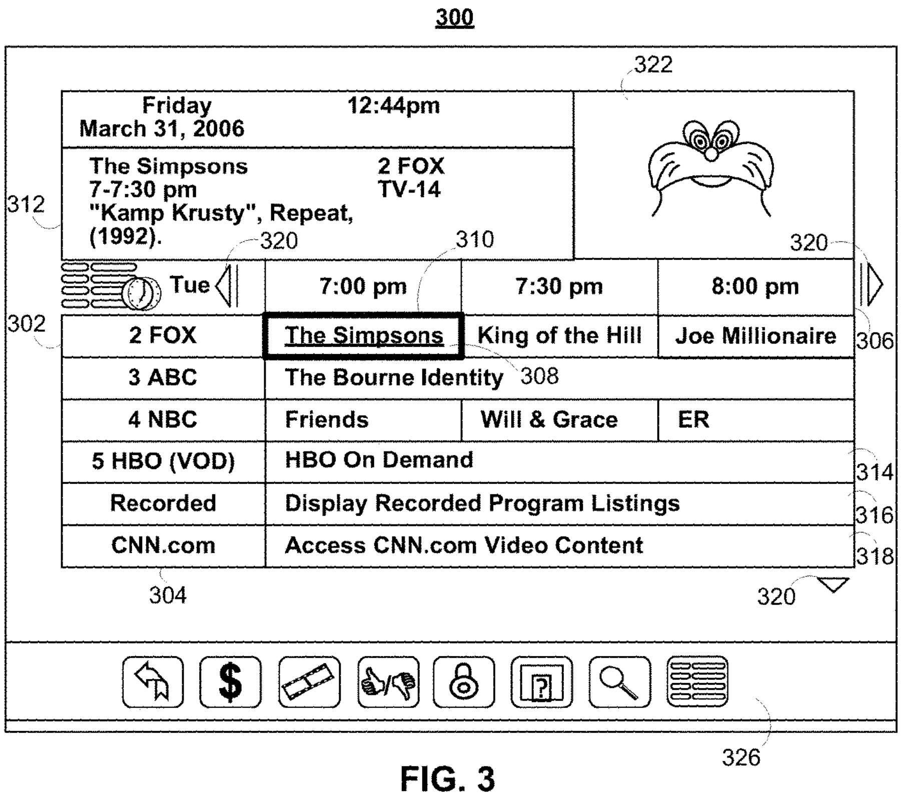
FIG. 3 shows an illustrative example of a display screen for use in accessing media content, in accordance with some embodiments of the disclosure.
Figure 4:
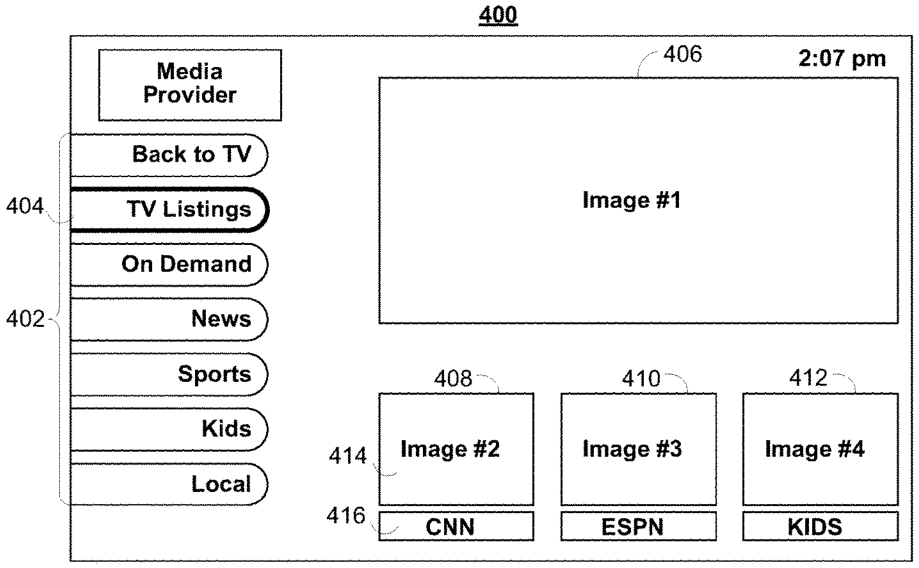
FIG. 4 shows another illustrative example of a display screen used in accessing media content, in accordance with some embodiments of the disclosure.

FIGS. 3-4 show illustrative display screens that may be used to provide media guidance data. The display screens shown in FIGS. 3-4 may be implemented on any suitable user equipment device or platform. While the displays of FIGS. 3-4 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 3 shows illustrative grid of a program listings display 300 arranged by time and channel that also enables access to different types of content in a single display. Display 300 may include grid 302 with: (1) a column of channel/content type identifiers 304, where each channel/content type identifier (which is a cell in the column) identifies a different channel or content type available; and (2) a row of time identifiers 306, where each time identifier (which is a cell in the row) identifies a time block of programming. Grid 302 also includes cells of program listings, such as program listing 308, where each listing provides the title of the program provided on the listing's associated channel and time. With a user input device, a user can select program listings by moving highlight region 310. Information relating to the program listing selected by highlight region 310 may be provided in program information region 312. Region 312 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 302 may provide media guidance data for non-linear programming including on-demand listing 314, recorded content listing 316, and Internet content listing 318. A display combining media guidance data for content from different types of content sources is sometimes referred to as a "mixed-media" display. Various permutations of the types of media guidance data that may be displayed that are different than display 300 may be based on user selection or guidance application definition (e.g., a display of only recorded and broadcast listings, only on-demand and broadcast listings, etc.). As illustrated, listings 314, 316, and 318 are shown as spanning the entire time block displayed in grid 302 to indicate that selection of these listings may provide access to a display dedicated to on-demand listings, recorded listings, or Internet listings, respectively. In some embodiments, listings for these content types may be included directly in grid 302. Additional media guidance data may be displayed in response to the user selecting one of the navigational icons 320. (Pressing an arrow key on a user input device may affect the display in a similar manner as selecting navigational icons 320.)

Display 300 may also include video region 322, and options region 326. Video region 322 may allow the user to view and/or preview programs that are currently available, will be available, or were available to the user. The content of video region 322 may correspond to, or be independent from, one of the listings displayed in grid 302. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 326 may allow the user to access different types of content, media guidance application displays, and/or media guidance application features. Options region 326 may be part of display 300 (and other display screens described herein), or may be invoked by a user by selecting an on-screen option or pressing a dedicated or assignable button on a user input device. The selectable options within options region 326 may concern features related to program listings in grid 302 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 6. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 4. Video mosaic display 400 includes selectable options 402 for content information organized based on content type, genre, and/or other organization criteria. In display 400, television listings option 404 is selected, thus providing listings 406, 408, 410, and 412 as broadcast program listings. In display 400 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 408 may include more than one portion, including media portion 414 and text portion 416. Media portion 414 and/or text portion 416 may be selectable to view content in full-screen or to view information related to the content displayed in media portion 414 (e.g., to view listings for the channel that the video is displayed on).

The listings in display 400 are of different sizes (i.e., listing 406 is larger than listings 408, 410, and 412), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 5:
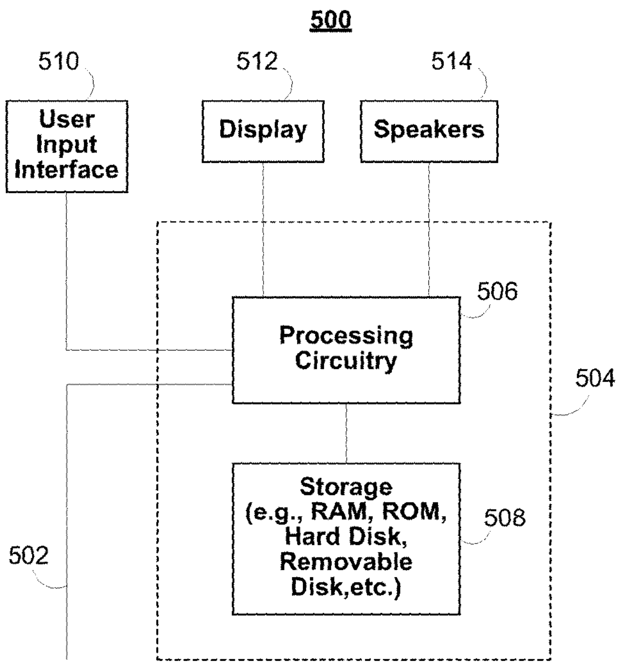
FIG. 5 is a block diagram of an illustrative user equipment device, in accordance with some embodiments of the disclosure.

Users may access content and the media guidance application (and its display screens described above and below) from one or more of their user equipment devices. FIG. 5 shows a generalized embodiment of illustrative user equipment device 500. More specific implementations of user equipment devices are discussed below in connection with FIG. 6. User equipment device 500 may receive content and data via input/output (hereinafter "I/O") path 502. I/O path 502 may provide content (e.g., broadcast programming, on-demand programming, Internet content, content available over a local area network (LAN) or wide area network (WAN), and/or other content) and data to control circuitry 504, which includes processing circuitry 506 and storage 508. Control circuitry 504 may be used to send and receive commands, requests, and other suitable data using I/O path 502. I/O path 502 may connect control circuitry 504 (and specifically processing circuitry 506) to one or more communications paths (described below). I/O functions may be provided by one or more of these communications paths, but are shown as a single path in FIG. 5 to avoid overcomplicating the drawing.

Control circuitry 504 may be based on any suitable processing circuitry such as processing circuitry 506. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 504 executes instructions for a media guidance application stored in memory (i.e., storage 508). Specifically, control circuitry 504 may be instructed by the media guidance application to perform the functions discussed above and below. For example, the media guidance application may provide instructions to control circuitry 504 to generate the media guidance displays. In some implementations, any action performed by control circuitry 504 may be based on instructions received from the media guidance application.

In client-server based embodiments, control circuitry 504 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 6). In addition, communications circuitry may include circuitry that enables peer-to-peer communication of user equipment devices, or communication of user equipment devices in locations remote from each other (described in more detail below).

Memory may be an electronic storage device provided as storage 508 that is part of control circuitry 504. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 508 may be used to store various types of content described herein as well as media guidance data described above. Nonvolatile memory may also be used (e.g., to launch a boot-up routine and other instructions). Cloud-based storage, described in relation to FIG. 6, may be used to supplement storage 508 or instead of storage 508.

Control circuitry 504 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 504 may also include scaler circuitry for upconverting and downconverting content into the preferred output format of the user equipment 500. Circuitry 504 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 508 is provided as a separate device from user equipment 500, the tuning and encoding circuitry (including multiple tuners) may be associated with storage 508.

A user may send instructions to control circuitry 504 using user input interface 510. User input interface 510 may be any suitable user interface, such as a remote control, mouse, trackball, keypad, keyboard, touch screen, touchpad, stylus input, joystick, voice recognition interface, or other user input interfaces. Display 512 may be provided as a stand-alone device or integrated with other elements of user equipment device 500. For example, display 512 may be a touchscreen or touch-sensitive display. In such circumstances, user input interface 510 may be integrated with or combined with display 512. Display 512 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 512 may be HDTV-capable. In some embodiments, display 512 may be a 3D display, and the interactive media guidance application and any suitable content may be displayed in 3D. A video card or graphics card may generate the output to the display 512. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 504. The video card may be integrated with the control circuitry 504. Speakers 514 may be provided as integrated with other elements of user equipment device 500 or may be stand-alone units. The audio component of videos and other content displayed on display 512 may be played through speakers 514. In some embodiments, the audio may be distributed to a receiver (not shown), which processes and outputs the audio via speakers 514.

The guidance application may be implemented using any suitable architecture. For example, it may be a stand-alone application wholly-implemented on user equipment device 500. In such an approach, instructions of the application are stored locally (e.g., in storage 508), and data for use by the application is downloaded on a periodic basis (e.g., from an out-of-band feed, from an Internet resource, or using another suitable approach). Control circuitry 504 may retrieve instructions of the application from storage 508 and process the instructions to generate any of the displays discussed herein. Based on the processed instructions, control circuitry 504 may determine what action to perform when input is received from input interface 510. For example, movement of a cursor on a display up/down may be indicated by the processed instructions when input interface 510 indicates that an up/down button was selected.

In some embodiments, the media guidance application is a client-server based application. Data for use by a thick or thin client implemented on user equipment device 500 is retrieved on-demand by issuing requests to a server remote to the user equipment device 500. In one example of a client-server based guidance application, control circuitry 504 runs a web browser that interprets web pages provided by a remote server. For example, the remote server may store the instructions for the application in a storage device. The remote server may process the stored instructions using circuitry (e.g., control circuitry 504) and generate the displays discussed above and below. The client device may receive the displays generated by the remote server and may display the content of the displays locally on equipment device 500. This way, the processing of the instructions is performed remotely by the server while the resulting displays are provided locally on equipment device 500. Equipment device 500 may receive inputs from the user via input interface 510 and transmit those inputs to the remote server for processing and generating the corresponding displays. For example, equipment device 500 may transmit a communication to the remote server indicating that an up/down button was selected via input interface 510. The remote server may process instructions in accordance with that input and generate a display of the application corresponding to the input (e.g., a display that moves a cursor up/down). The generated display is then transmitted to equipment device 500 for presentation to the user.

In some embodiments, the media guidance application is downloaded and interpreted or otherwise run by an interpreter or virtual machine (run by control circuitry 504). In some embodiments, the guidance application may be encoded in the ETV Binary Interchange Format (EBIF), received by control circuitry 504 as part of a suitable feed, and interpreted by a user agent running on control circuitry 504. For example, the guidance application may be an EBIF application. In some embodiments, the guidance application may be defined by a series of JAVA-based files that are received and run by a local virtual machine or other suitable middleware executed by control circuitry 504. In some of such embodiments (e.g., those employing MPEG-2 or other digital media encoding schemes), the guidance application may be, for example, encoded and transmitted in an MPEG-2 object carousel with the MPEG audio and video packets of a program.

Figure 6:
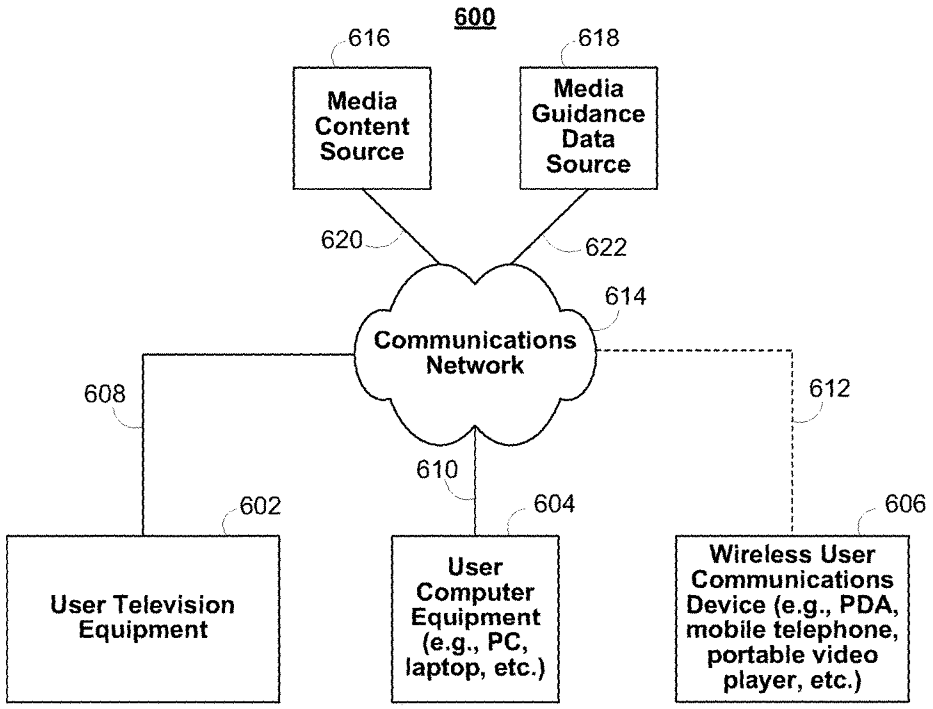
FIG. 6 is a block diagram of an illustrative media system, in accordance with some embodiments of the disclosure.

User equipment device 500 of FIG. 5 can be implemented in system 600 of FIG. 6 as user television equipment 602, user computer equipment 604, wireless user communications device 606, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 5 may not be classified solely as user television equipment 602, user computer equipment 604, or a wireless user communications device 606. For example, user television equipment 602 may, like some user computer equipment 604, be Internet-enabled allowing for access to Internet content, while user computer equipment 604 may, like some television equipment 602, include a tuner allowing for access to television programming. The media guidance application may have the same layout on various different types of user equipment or may be tailored to the display capabilities of the user equipment. For example, on user computer equipment 604, the guidance application may be provided as a web site accessed by a web browser. In another example, the guidance application may be scaled down for wireless user communications devices 606.

In system 600, there is typically more than one of each type of user equipment device but only one of each is shown in FIG. 6 to avoid overcomplicating the drawing. In addition, each user may utilize more than one type of user equipment device and also more than one of each type of user equipment device.

In some embodiments, a user equipment device (e.g., user television equipment 602, user computer equipment 604, wireless user communications device 606) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 614. Namely, user television equipment 602, user computer equipment 604, and wireless user communications device 606 are coupled to communications network 614 via communications paths 608, 610, and 612, respectively. Communications network 614 may be one or more networks including the Internet, a mobile phone network, mobile voice or data network (e.g., a 4G or LTE network), cable network, public switched telephone network, or other types of communications network or combinations of communications networks. Paths 608, 610, and 612 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 612 is drawn with dotted lines to indicate that in the exemplary embodiment shown in FIG. 6 it is a wireless path and paths 608 and 610 are drawn as solid lines to indicate they are wired paths (although these paths may be wireless paths, if desired). Communications with the user equipment devices may be provided by one or more of these communications paths, but are shown as a single path in FIG. 6 to avoid overcomplicating the drawing.

Although communications paths are not drawn between user equipment devices, these devices may communicate directly with each other via communication paths, such as those described above in connection with paths 608, 610, and 612, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 614.

System 600 includes content source 616 and media guidance data source 618 coupled to communications network 614 via communication paths 620 and 622, respectively. Paths 620 and 622 may include any of the communication paths described above in connection with paths 608, 610, and 612. Communications with the content source 616 and media guidance data source 618 may be exchanged over one or more communications paths, but are shown as a single path in FIG. 6 to avoid overcomplicating the drawing. In addition, there may be more than one of each of content source 616 and media guidance data source 618, but only one of each is shown in FIG. 6 to avoid overcomplicating the drawing. (The different types of each of these sources are discussed below.) If desired, content source 616 and media guidance data source 618 may be integrated as one source device. Although communications between sources 616 and 618 with user equipment devices 602, 604, and 606 are shown as through communications network 614, in some embodiments, sources 616 and 618 may communicate directly with user equipment devices 602, 604, and 606 via communication paths (not shown) such as those described above in connection with paths 608, 610, and 612.

Content source 616 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 616 may be the originator of content (e.g., a television broadcaster, a Webcast provider, etc.) or may not be the originator of content (e.g., an on-demand content provider, an Internet provider of content of broadcast programs for downloading, etc.). Content source 616 may include cable sources, satellite providers, on-demand providers, Internet providers, over-the-top content providers, or other providers of content. Content source 616 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 618 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 618 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 618 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 618 may provide user equipment devices 602, 604, and 606 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 508, and executed by control circuitry 504 of a user equipment device 500. In some embodiments, media guidance applications may be client-server applications where only a client application resides on the user equipment device, and server application resides on a remote server. For example, media guidance applications may be implemented partially as a client application on control circuitry 504 of user equipment device 500 and partially on a remote server as a server application (e.g., media guidance data source 618) running on control circuitry of the remote server. When executed by control circuitry of the remote server (such as media guidance data source 618), the media guidance application may instruct the control circuitry to generate the guidance application displays and transmit the generated displays to the user equipment devices. The server application may instruct the control circuitry of the media guidance data source 618 to transmit data for storage on the user equipment. The client application may instruct control circuitry of the receiving user equipment to generate the guidance application displays.

Content and/or media guidance data delivered to user equipment devices 602, 604, and 606 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 600 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 6.

In one approach, user equipment devices may communicate with each other within a home network. User equipment devices can communicate with each other directly via short-range point-to-point communication schemes described above, via indirect paths through a hub or other similar device provided on a home network, or via communications network 614. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 616 to access content. Specifically, within a home, users of user television equipment 602 and user computer equipment 604 may access the media guidance application to navigate among and locate desirable content. Users may also access the media guidance application outside of the home using wireless user communications devices 606 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 614. These cloud resources may include one or more content sources 616 and one or more media guidance data sources 618. In addition or in the alternative, the remote computing sites may include other user equipment devices, such as user television equipment 602, user computer equipment 604, and wireless user communications device 606. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 604 or wireless user communications device 606 having content capture feature. Alternatively, the user can first transfer the content to a user equipment device, such as user computer equipment 604. The user equipment device storing the content uploads the content to the cloud using a data transmission service on communications network 614. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 5.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 7:
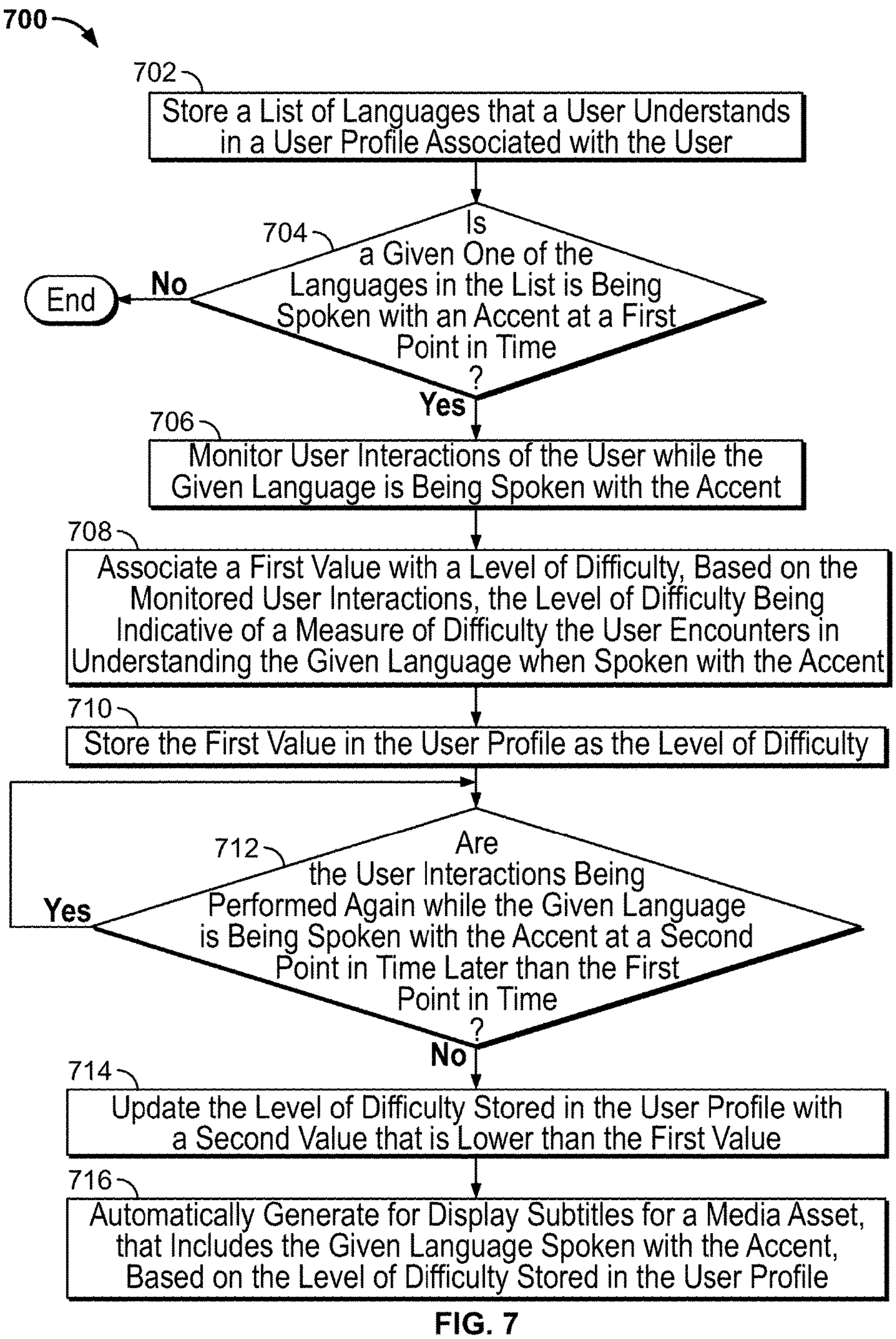
FIG. 7 is a flowchart of illustrative steps for automatically enabling subtitles based on a user profile when a language is spoken with an accent, in accordance with some embodiments of the disclosure.

FIG. 7 is a flowchart of illustrative steps for automatically enabling subtitles based on a user profile when a language is spoken with an accent, in accordance with some embodiments of the disclosure. For example, a media guidance application may instruct control circuitry 504 to execute the elements of process 700.

Process 700 begins at 702, where the media guidance application stores (e.g., via control circuitry 504 in storage 508) a list of languages that a user understands in a user profile associated with the user. For example, the media guidance application may store languages list 206 in storage 508.

Process 700 continues to 704, where the media guidance application determines (e.g., via control circuitry 504) whether a given one of the languages in the list is being spoken with an accent at a first point in time. For example, the media guidance application may determine if English is being spoken with a British accent on user equipment (e.g., user equipment 602, 604, or 606), similar to as discussed for detecting an accent in media asset 122 in relation to FIG. 1. If the media guidance application determines (e.g., via control circuitry 504) that a given one of the languages in the list is not being spoken with an accent at a first point in time, process 700 ends.

If the media guidance application determines (e.g., via control circuitry 504) that a given one of the languages in the list is being spoken with an accent at a first point in time, process 700 continues to 706, where the media guidance application monitors (e.g., via control circuitry 504) user interactions of the user while the given language is being spoken with the accent. For example, the media guidance application may determine the first plurality of interactions as described in relation to determining user specific level of difficulty 224 for accent 222 as discussed in relation to FIG. 2 above.

Process 700 continues to 708, where the media guidance application associates (e.g., via control circuitry 504) a first value with a level of difficulty, based on the monitored user interactions, the level of difficulty being indicative of a measure of difficulty the user encounters in understanding the given language when spoken with the accent. For example, the media guidance application may assign a value of twenty to user specific level of difficulty 224, as discussed above in relation to FIG. 2 above.

Process 700 continues to 710, where the media guidance application stores (e.g., via control circuitry 504 in storage 508) the first value in the user profile as the level of difficulty. For example, the media guidance application may store, in storage 508, the second data structure containing the user specific level of difficulty 224 of twenty, as discussed in relation to FIG. 2.

Process 700 continues to 712, where the media guidance application determines (e.g., via control circuitry 504) whether the user interactions are being performed again while the given language is being spoken with the accent at a second point in time later than the first point in time. For example, the media guidance application may determine whether the given language is being spoken with accent 222, in a manner similar to as described in relation to detecting that media asset 122 includes the given language spoken in the accent in relation to FIG. 1.

If the media guidance application determines (e.g., via control circuitry 504) that the user interactions are not being performed again while the given language is being spoken with the accent at a second point in time later than the first point in time, then process 700 repeats 712 at a third point in time. If the media guidance application instead determines (e.g., via control circuitry 504) that the user interactions are being performed again while the given language is being spoken with the accent at a second point in time later than the first point in time, process 700 continues to 714, where the media guidance application updates (e.g., via control circuitry 504) the level of difficulty stored in the user profile with a second value that is lower than the first value. For example, the media guidance application may update user specific level of difficulty 224 to six as described above in relation to FIG. 2.

Process 700 continues to 716, where the media guidance application automatically generates (e.g., via control circuitry 504) for display (e.g., on display 512) subtitles for a media asset, that includes the given language spoken with the accent, based on the level of difficulty stored in the user profile. For example, the media guidance application may automatically generate for display subtitles 104 or pop-up 106 as discussed in relation to FIG. 1.

Figure 8:
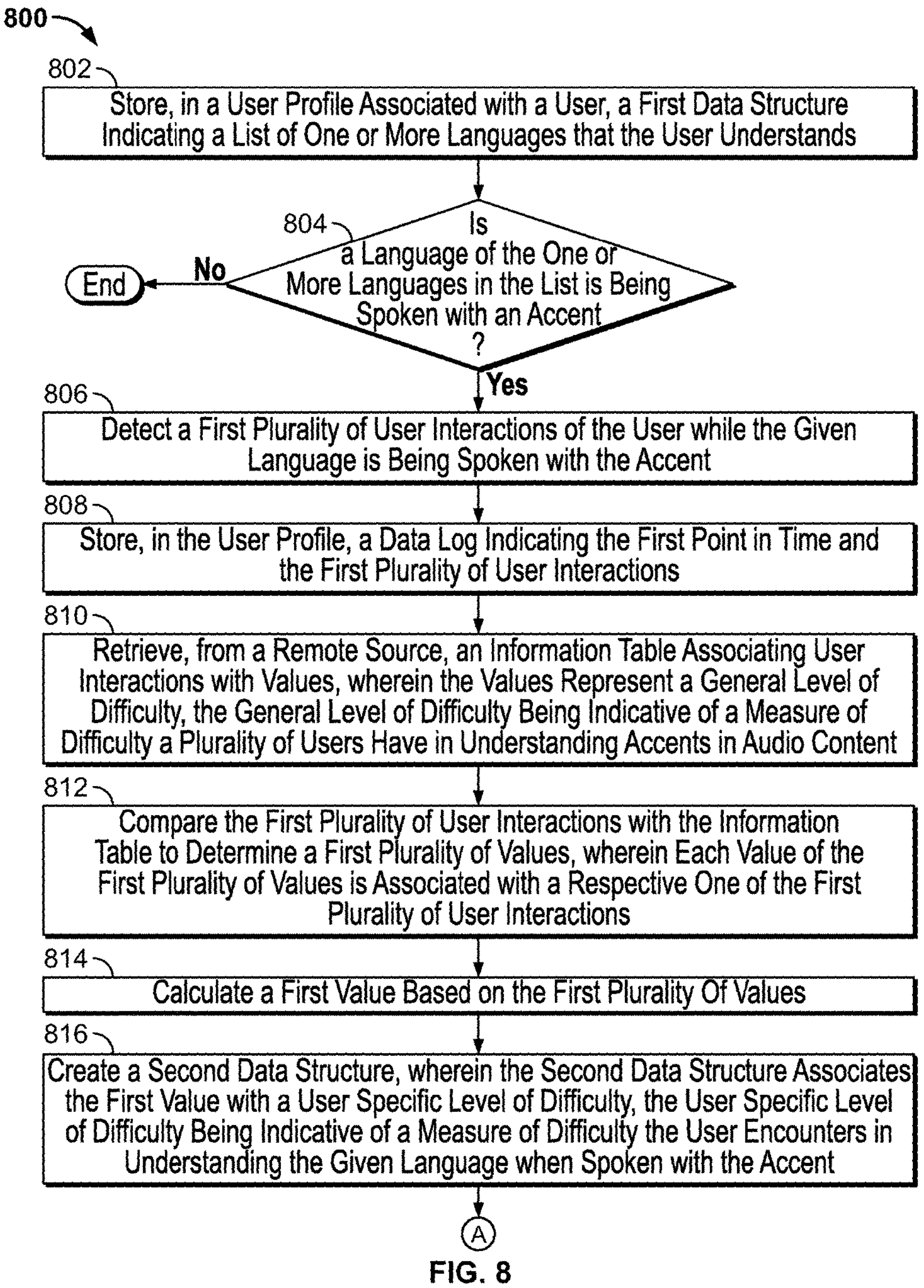
FIG. 8 is a flowchart of illustrative steps for automatically enabling subtitles based on a user profile when a language is spoken with an accent, in accordance with some embodiments of the disclosure.
Figure 8:
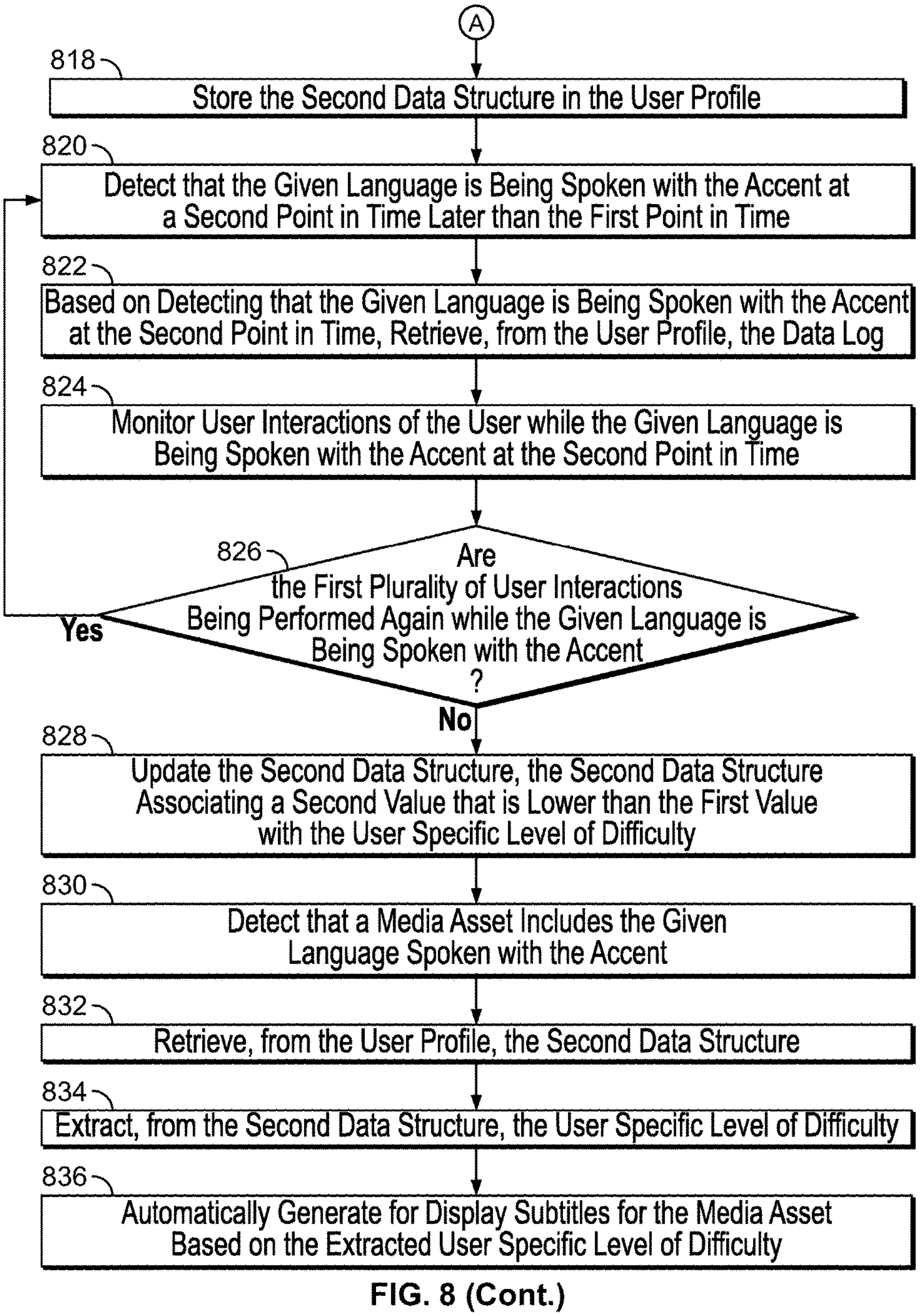

FIG. 8 is a flowchart of illustrative steps for automatically enabling subtitles based on a user profile when a language is spoken with an accent, in accordance with some embodiments of the disclosure. For example, a media guidance application may instruct control circuitry 504 to execute the elements of process 800.

Process 800 begins at 802, where the media guidance application stores (e.g., via control circuitry 504 in storage 508) in a user profile associated with a user, a first data structure indicating a list of one or more languages that the user understands. For example, the media guidance application may store, in storage 508, the first data structure with languages list 206 as discussed in relation to FIG. 2.

Process 800 continues to 804, where the media guidance application determines (e.g., via control circuitry 504) whether a language of the one or more languages in the list is being spoken with an accent. For example, the media guidance application may determine if English is being spoken with a British accent on user equipment (e.g., user equipment 602, 604, or 606), similar to as discussed for detecting an accent in media asset 122 in relation to FIG. 1. If the media guidance application determines (e.g., via control circuitry 504) that a language of the one or more languages in the list is not being spoken with an accent, process 800 ends.

If instead, the media guidance application determines (e.g., via control circuitry 504) that a language of the one or more languages in the list is being spoken with an accent, process 800 continues to 806, where the media guidance application detects (e.g., via control circuitry 504) a first plurality of user interactions of the user while the given language is being spoken with the accent. For example, the media guidance application may detect that the user said "I can't understand him" and rewound "Winter is Coming" while English is being spoken with accent 222 as discussed in relation to automatically determining user specific level of difficulty 224 in FIG. 2 above.

Process 800 continues to 808, where the media guidance application stores (e.g., via control circuitry 504 in storage 508), in the user profile, a data log indicating the first point in time and the first plurality of user interactions. For example, the media guidance application may store the data log in storage 508 as described in relation automatically determining user specific level of difficulty 224 in FIG. 2 above.

Process 800 continues to 810, where the media guidance application retrieves (e.g., via control circuitry 504), from a remote source (e.g., media guidance data source 618) an information table associating user interactions with values.

The values represent a general level of difficulty indicative of a measure of difficulty a plurality of users have in understanding accents in audio content. For example, the media guidance application may retrieve information table 1002 in FIG. 10 from storage 508.

Process 800 continues to 812, where the media guidance application compares (e.g., via control circuitry 504) the first plurality of user interactions with the information table to determine a first plurality of values, wherein each value of the first plurality of values is associated with a respective one of the first plurality of user interactions. For example, the media guidance application may compare the first plurality of user interactions with user interactions column 1004 of information table 1002, and determine that the first plurality of values are the values in values column 1006 corresponding to the first plurality of interactions in user interactions column 1004 as described above in relation to automatically determining user specific level of difficulty 224 in relation to FIG. 2.

Process 800 continues to 814, where the media guidance application calculates (e.g., via control circuitry 504) a first value based on the first plurality of values. For example, the media guidance application may calculate the first value (e.g., user specific level of difficulty 224) to be twenty as described above in relation to FIG. 2.

Process 800 continues to 816, where the media guidance application creates (e.g., via control circuitry 504) a second data structure. The second data structure associates the first value with a user specific level of difficulty. The user specific level of difficulty may be indicative of a measure of difficulty the user encounters in understanding the given language when spoken with the accent. For example, the media guidance application may create a second data structure indicative of accent list 206 that associates twenty with user specific level of difficulty 224 and with accent 222, as described in relation to FIG. 2.

Process 800 continues to 818, where the media guidance application store (e.g., via control circuitry 504 in storage 518) the second data structure in the user profile. For example, media guidance application may store the second data structure indicative of accent list 208 in storage 508.

Process 800 continues to 820, where the media guidance application detects (e.g., via control circuitry 504) that the given language is being spoken with the accent at a second point in time later than the first point in time. For example, the media guidance application may determine that media asset 122 includes the language spoken with an accent at a second point in time later than the first point in time, as described in relation to FIG. 1.

Process 800 continues to 822, where the media guidance application retrieves (e.g., via control circuitry 504 from storage 508), from the user profile, based on detecting that the given language is being spoken with the accent at the second point in time the data log. For example, the media guidance application may query storage 508 for the data log, as described in relation to automatically updating user specific level of difficulty 224 in relation to FIG. 2.

Process 800 continues to 824, where the media guidance application monitors (e.g., via control circuitry 504) user interactions of the user while the given language is being spoken with the accent at the second point in time. For example, the media guidance application may monitor the user interactions for the user saying "I can't understand him" or rewinding "A Study in Pink" while English is being spoken with accent 222, or determine a second plurality of user interactions as described in relation to FIG. 2.

Process 800 continues to 826, where the media guidance application determines (e.g., via control circuitry 504) if the first plurality of user interactions are being performed again while the given language is being spoken with the accent. For example, the media guidance application may monitor the user interactions to determine if the user said "I can't understand him" or rewound "A Study in Pink" while English is being spoken with accent 222 at the second point in time or determine whether the second plurality of user interactions are the same as the first plurality of user interactions as described in relation to FIG. 2. If the media guidance application determines that the first plurality of interactions are being performed again (e.g., the second plurality of interactions are the same as the first plurality of user interactions), process 800 returns to 820, where the media guidance application will detect that the given language is being spoken with the accent at a third point in time.

If the media guidance application determines that the first plurality of interactions are not being performed again (e.g., by not detecting the first plurality of interactions again based on the monitoring), process 800 continues to 828, where the media guidance application updates (e.g., via control circuitry 504) the second data structure, the second data structure associating a second value that is lower than the first value with the user specific level of difficulty. For example, the media guidance application may update user specific level of difficulty 224 in any manner as described above in relation to FIG. 2, for example, by calculating updated user specific level of difficulty 224 as six using a second plurality of user interactions and user information table 1002.

Process 800 continues to 830, where the media guidance application detects (e.g., via control circuitry 504) that a media asset includes the given language spoken with the accent. For example, the media guidance application may detect that media asset 122 includes English spoken with a British accent in any manner described in relation to FIG. 1.

Process 800 continues to 832, where the media guidance application retrieves (e.g., via control circuitry 504 from storage 508), from the user profile, the second data structure. For example, the media guidance application may query storage 508 for the second data structure indicating accent list 208 as described in relation to FIG. 2.

Process 800 continues to 834, where the media guidance application extracts (e.g., via control circuitry 504), from the second data structure, the user specific level of difficulty. For example, the second data structure user specific level of difficulty 224 of twenty from the second data structure.

Process 800 continues to 836, where the media guidance application automatically generates for display (e.g., via control circuitry 504 on display 512) subtitles for the media asset based on the extracted user specific level of difficulty. For example, the media guidance application may automatically generate for display subtitles 104 based on determining that user specific level of difficulty 224 exceeds a threshold user specific level of difficulty or accent level, as described in relation to FIG. 1.

Figure 9:
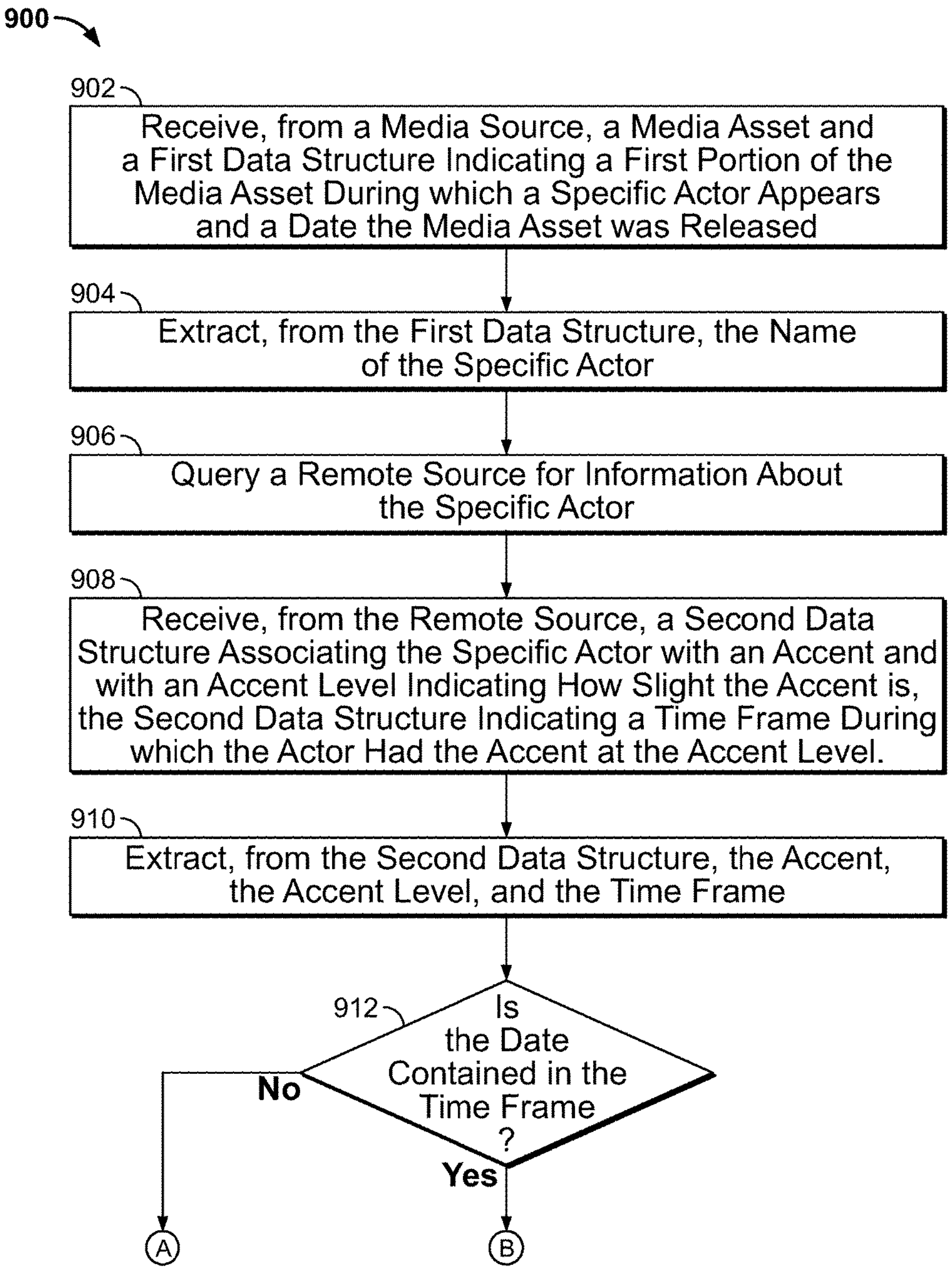
FIG. 9 is a flowchart of illustrative steps for detecting that a media asset includes a given language spoken with an accent and automatically enabling subtitles based on the detection, in accordance with some embodiments of the disclosure.
Figure 9:
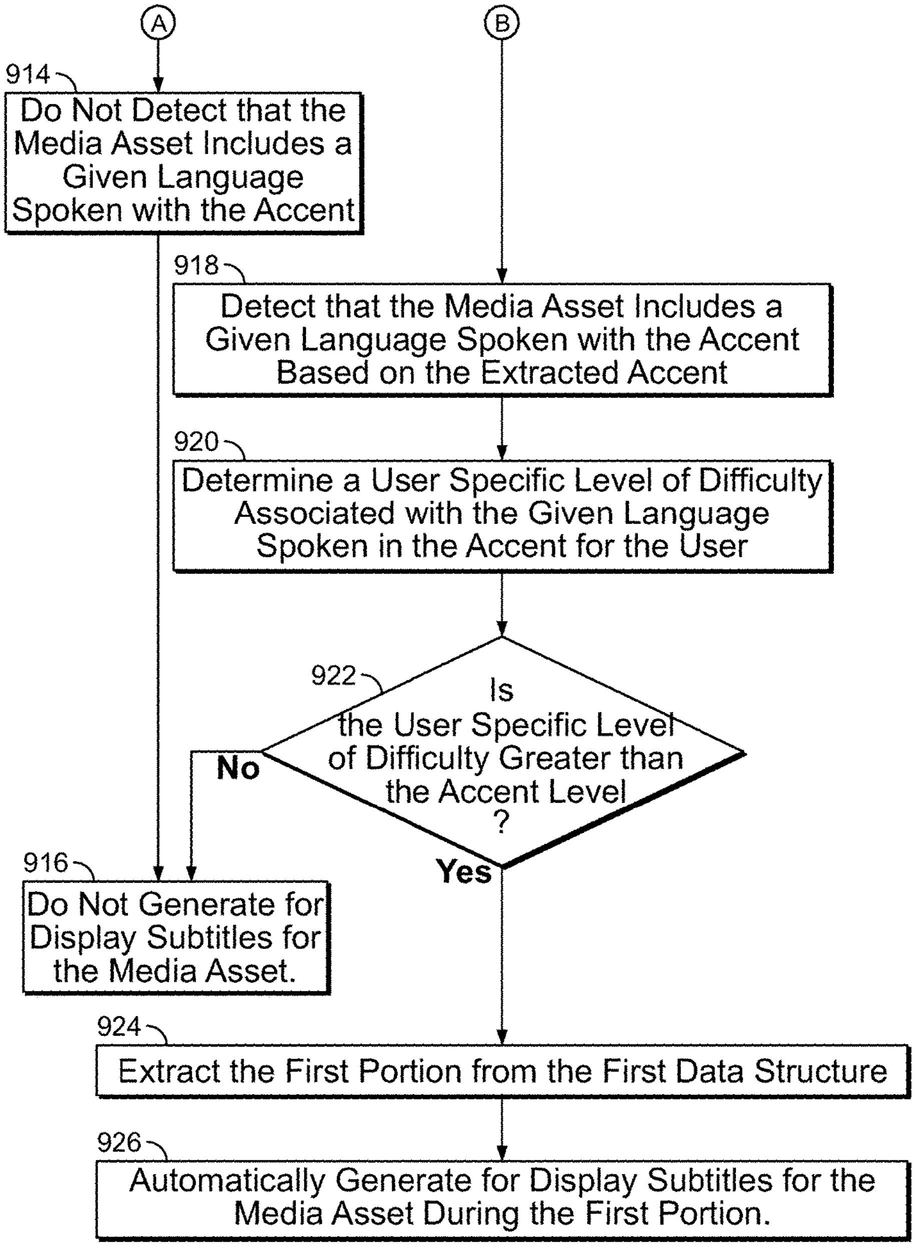

FIG. 9 is a flowchart of illustrative steps for detecting that a media asset includes a given language spoken with an accent and automatically enabling subtitles based on the detection, in accordance with some embodiments of the disclosure. For example, a media guidance application may instruct control circuitry 504 to execute the elements of process 900.

Process 900 begins at 902, where the media guidance application receives (e.g., via control circuitry 504 from media content source 616 or media guidance data source 618), from a media source, a media asset and a first data structure indicating a first portion of the media asset during which a specific actor appears and a date the media asset was released. For example, the first data structure may indicate that Maggie Smith appears from one minute to five minutes from the beginning of media asset 122, and that media asset 122 was released in 2001 as described above in relation to FIG. 1.

Process 900 continues to 904, where the media guidance application extracts (e.g., via control circuitry 504), from the first data structure, the name of the specific actor. For example, the media guidance application may determine that Maggie Smith appears in media asset 122 as described in relation to FIG. 1.

Process 900 continues to 906, where the media guidance application queries (e.g., via control circuitry 504) a remote source (e.g., media guidance data source 618) for information about the specific actor. For example, the media guidance application may query media guidance data source 618 for information about Maggie Smith, as described in relation to automatically enabling subtitles 104 in relation to FIG. 1.

Process 900 continues to 908, where the media guidance application receives (e.g., via control circuitry 504) from the remote source, a second data structure associating the specific actor with an accent and with an accent level indicating how slight the accent is, the second data structure indicating a time frame during which the actor had the accent at the accent level. For example, the media guidance application may receive media asset 122 and the second data structure indicating a plurality of time periods during which the specific actor had different accents or different accent levels for the same accent as described in relation to FIG. 1.

Process 900 continues to 910, where the media guidance application extracts (e.g., via control circuitry 504), from the second data structure, the accent, accent level, and the time frame. For example, the media guidance application may determine that the accent is “British,” the accent level is “ten” and the time frame is 1991 to 2002.

Process 900 continues to 912, where the media guidance application determines (e.g., via control circuitry 504) if the date the media asset was released is in the time frame. If the media guidance application determines that the date the media asset was released is not in the time frame, process 900 continues to 914, where the media guidance application does not detect that media asset includes a given language spoken with the accent. Process 900 assumes a second data structure with a single time frame, however, it would be clear to one of ordinary skill in the art that the first data structure may have multiple time frames, and that process 900 may iteratively repeat 910 and 912 for all time frames to determine if any of the time frames contain the date the media asset was released. Only if media guidance application determines that the second data structure contains no time frames with the date the media asset was released does process 900 continue to 914. Process continues to step 916, where the media guidance application does not generate (e.g., via control circuitry 504) for display (e.g., on display 512) subtitles for the media asset. For example, media guidance application may not generate for display subtitles 104, as discussed in relation to FIG. 1.

If the media guidance application determines that the date the media asset was released is in the time frame, for example, by determining that 2001 is between 1991 and 2002, process 900 continues to 918, where the media guidance application detects (e.g., via control circuitry 504) that the media asset includes a given language spoken with the accent based on the extracted accent. For example, the media guidance application may detect that media asset 122 includes English spoken with a British accent with an accent level of ten based on the first data structure and the second data structure as described in relation to FIG. 1.

Process 900 continues to 920, where the media guidance application determines (e.g., via control circuitry 504) a user specific level of difficulty associated with the given language spoken in the accent for the user. For example, the media guidance application may retrieve the second data structure indicating accent list 208 from storage 508 indicating user specific level of difficulty 224. The media guidance application may determine user specific level of difficulty 224 in any manner described in relation to FIG. 2.

Process 900 continues to 922, where the media guidance application determines (e.g., via control circuitry 504) if the user specific level of difficulty is greater than the accent level. If the media guidance application determines that the user specific level of difficulty is not greater than the accent level, then process 900 continues to 916, where the media guidance application does not generate for display subtitles for the media asset.

If the media guidance application determine that the user specific level of difficulty is greater than the accent level, for example, by determining that user specific level of difficulty 224 of twenty is greater than an accent level of ten, process 900 continues to 924, where the media guidance application extracts (e.g., via control circuitry 504) the first portion from the data structure. For example, the media guidance application may determine that the first portion is from one to five minutes from the beginning of media asset 122, as described in relation to FIG. 1.

Process 900 continues to 926, where the media guidance application automatically generates (e.g., via control circuitry 504) for display (e.g., on display 512) subtitles for the media asset during the first portion. For example, the media guidance application may enable subtitles 104 at one minute and disable subtitles 104 at five minutes from the beginning of media asset 122, as described in relation to FIG. 1.

FIG. 10 shows an illustrative example of a graphic representation of an information table for determining the general level of difficulty associated with a user interaction, in accordance with some embodiments of the disclosure. For example, information table 1002 may contain user interactions column 1004 and values column 1006, and each user interaction in user interactions column 1004 may be associated with the value in values column 1006 in the same row. Values 1006 may represent a general level of difficulty indicative of a measure of difficulty a plurality of users have in understanding accents in audio content. For example, values 1006 may be on a scale of one to ten, ten indicating the most difficulty in understanding accents in audio content. User interaction column 1004 may contain user interactions of the user saying “What?,” saying “I can’t understand him,” raising the volume of a media asset, enabling subtitles, rewinding the media asset, pausing the media asset, cocking his or her head to one side, squinting, moving closer to the TV, and putting his or her hand to his or her ear, which may be associated with values of values column 1006 of seven, ten, five, ten, nine, three, two, six, four, and six respectively.

Information table 1004 may contain additional user interactions. User interactions may be any of a facial expression, rewinding a previous media asset, pausing the previous media asset, enabling subtitles, not disabling subtitles (e.g., selecting option 120), disabling subtitles (e.g., selecting option 118), increasing the volume, a head movement, a user gesture, a vocal utterance, a user setting input, a user geographic input, a user demographic information input, and a social media post, as discussed in relation to FIG. 1.

The media guidance application may determine that the user performs the user interactions in user interactions column 1004 using, for example, a camera, microphone, motion sensor, mobile phone, motion detector, user input from a remote, gyroscope, accelerometer, user equipment usage logs, GPS, location triangulation, user registration information, product information, web crawler, natural language processor, or any other suitable method for determining that the user performs the user interactions in user interactions column 1004.

Figure 11:
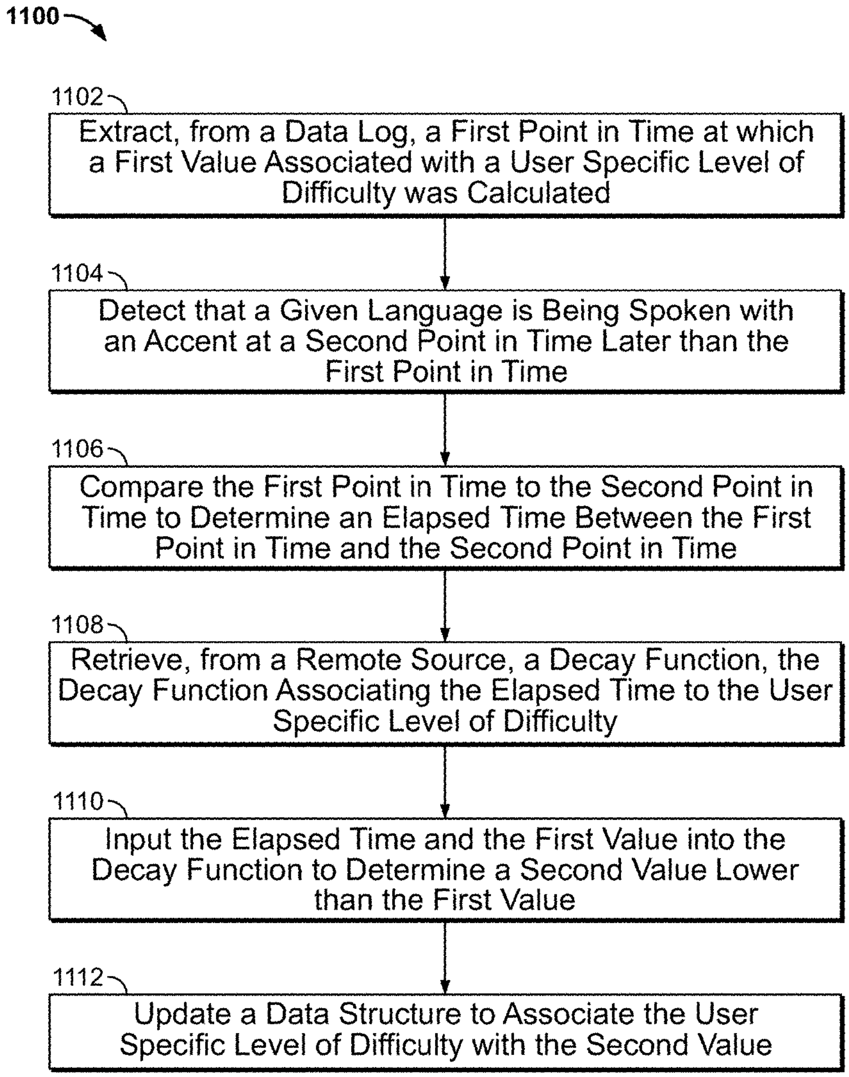
FIG. 11 is a flowchart of illustrative steps for updating a data structure to associate a user specific level of difficulty with a calculated second value, in accordance with some embodiments of the disclosure.

FIG. 11 is a flowchart of illustrative steps for updating a data structure to associate a user specific level of difficulty with a calculated second value, in accordance with some embodiments of the disclosure. For example, a media guidance application may instruct control circuitry 504 to execute the elements of process 1100.

Process 1100 begins at 1102, where the media guidance application extracts (e.g., via control circuitry 504), from a data log, a first point in time at which a first value associated with a user specific level of difficulty was calculated. For example, the media guidance application may extract Apr. 17, 2016 from the data log, which may be when user specific level of difficulty 224 of twenty was calculated, as discussed in relation to automatically updating user specific level of difficulty 224 in relation to FIG. 2.

Process 1100 continues to 1104, where the media guidance application detects (e.g., via control circuitry 504) that a given language is being spoken with an accent at a second point in time later than the first point in time. For example, the media guidance application may detect that media asset 122 includes English spoken with a British accent on Oct. 17, 2016 in any manner described in relation to FIG. 1.

Process 1100 continues to 1106, where the media guidance application compares (e.g., via control circuitry 504) the first point in time to the second point in time to determine an elapsed time between the first point in time and the second point in time. For example, the media guidance application may determine that the elapsed time is 183 days by subtracting Apr. 17, 2016 from Oct. 17, 2016, as discussed in relation to automatically updating user specific level of difficulty 224, as described in relation to FIG. 2.

Process 1100 continues to 1108, where the media guidance application retrieves (e.g., via control circuitry 504 from storage 508), from a remote source (e.g., media guidance data source 618) a decay function. The decay function may associate the elapsed time to the user specific level of difficulty. For example, the media guidance application may retrieve from storage 508 the decay function relating the elapsed time to user specific level of difficulty 224 as described in relation to updating user specific level of difficulty 224 in relation to FIG. 2.

Process 1100 continues to 1110, where the media guidance application inputs (e.g., via control circuitry 504) the elapsed time and the first value into the decay function to determine a second value lower than the first value. For example, the media guidance application may input twenty (e.g., the first user specific level of difficulty 224) and the elapsed time of 183 days into the decay function relating the elapsed time to user specific level of difficulty 224 to determine updated user specific level of difficulty 224 of six as described in relation to FIG. 2.

Process 1100 continues to 1112, where the media guidance application updates (e.g., via control circuitry 504) a data structure to associate the user specific level of difficulty with the second value. For example, the media guidance application may update the second data structure indicating accent list 208 to associate the user specific level of difficulty with updated user specific level of difficulty 224 of six as described in relation to FIG. 2.

Figure 12:
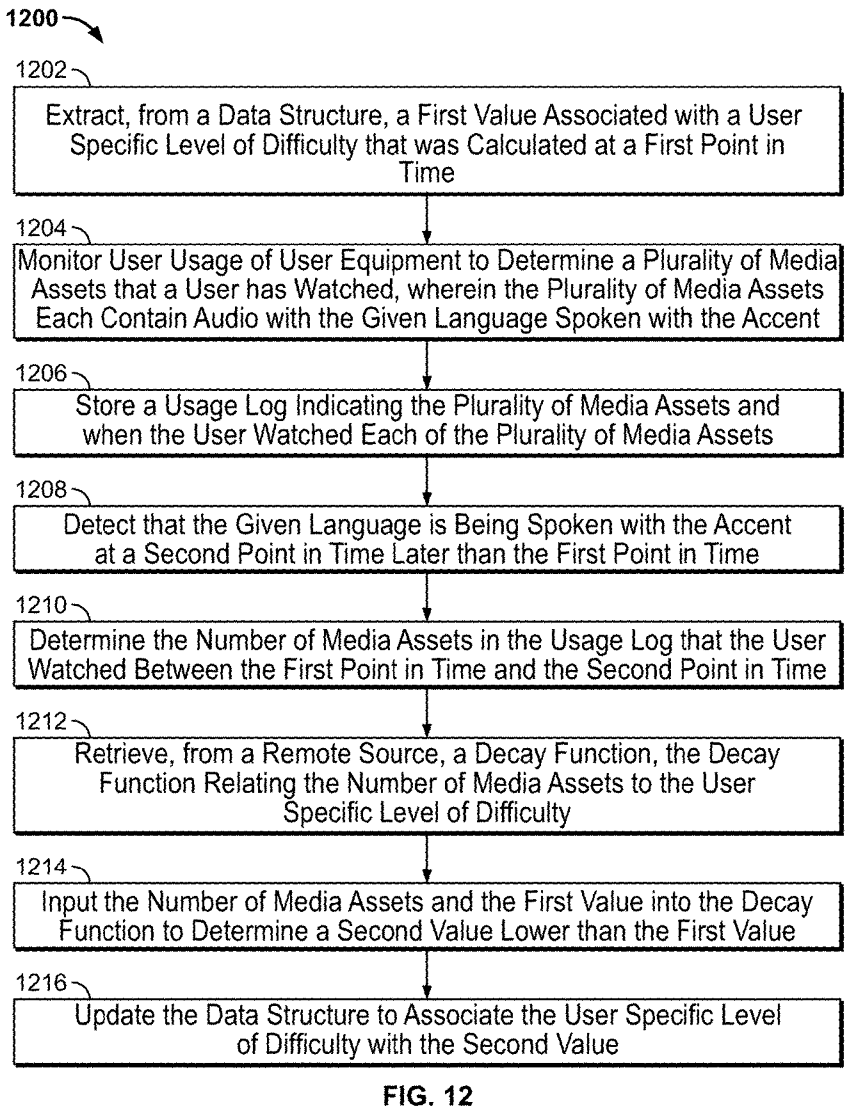
FIG. 12 is a flowchart of illustrative steps for updating a data structure to associate a user specific level of difficulty with a calculated second value, in accordance with some embodiments of the disclosure.

FIG. 12 is a flowchart of illustrative steps for updating a data structure to associate a user specific level of difficulty with a calculated second value, in accordance with some embodiments of the disclosure. For example, a media guidance application may instruct control circuitry 504 to execute the elements of process 1200.

Process 1200 begins at 1202, where the media guidance application extracts (e.g., via control circuitry 504), from a data structure, a first value associated with a user specific level of difficulty that was calculated at a first point in time. For example, the media guidance application may extract user specific level of difficulty 224, which may have been calculated on Apr. 17, 2016 at 8:30 PM, of twenty from the second data structure indicating accent list 208 as discussed in relation to automatically updating user specific level of difficulty 224, as described in relation to FIG. 2.

Process 1200 continues to 1204, where the media guidance application monitors (e.g., via control circuitry 504) user usage of user equipment to determine a plurality of media assets that a user has watched, wherein the plurality of media assets each contain audio with the given language spoken with the accent. For example, the media guidance application may monitor the user's usage of various user equipment (e.g., user equipment 602, 604, and 606) and determine that the user watched "Winter is Coming" on Apr. 17, 2016 at 8:30 PM, "The Kingsroad" on Apr. 18, 2016 at 4:00 PM, "Monty Python and the Holy Grail" on Aug. 5, 2016 at 10:00 AM, "Love Actually" on Jul. 27, 2016 at 12:00 PM, and "A Study in Pink" on Oct. 17, 2016, as discussed above in relation to FIG. 2.

Process 1200 continues to 1206, where the media guidance application stores (e.g., via control circuitry 504 in storage 508) a usage log indicating the plurality of media assets and when the user watched each of the plurality of media assets. For example, the media guidance application may store a usage log indicating the five media assets above associated with the times they were watched in storage 508, as described above in relation to FIG. 2.

Process 1200 continues to 1208, where the media guidance application detects (e.g., via control circuitry 504) that a given language is being spoken with an accent at a second point in time later than the first point in time. For example, the media guidance application may detect that media asset 122 includes English spoken with a British accent on Oct. 17, 2016 at 8:30 PM in any manner described in relation to FIG. 1.

Process 1200 continues to 1210, where the media guidance application determines (e.g., via control circuitry 504) the number of media assets in the usage log that the user watched between the first point in time and the second point in time. For example, the media guidance application may determine that the user watched three media assets containing the accent between Apr. 17, 2016 at 8:30 PM and Oct. 17, 2016 at 8:30 PM in a similar manner as described above with respect to automatically updating user specific level of difficulty 224 in relation to FIG. 2.

Process 1200 continues to 1212, where the media guidance application retrieves (e.g., via control circuitry 504), from a remote source (e.g., media guidance data source 618) a decay function. The decay function may associate the number of media assets to the user specific level of difficulty. For example, the media guidance application may retrieve from storage 508 the decay function relating the number of media assets to user specific level of difficulty 224 as described in relation to updating user specific level of difficulty 224 in relation to FIG. 2.

Process 1200 continues to 1214, where the media guidance application inputs (e.g., via control circuitry 504) the number of media assets and the first value into the decay function to determine a second value lower than the first value. For example, the media guidance application may input twenty (e.g., the first user specific level of difficulty 224) and the number of media assets of three into the decay function relating the number of media assets to user specific level of difficulty 224 to determine updated user specific level of difficulty 224 of six as described in relation to FIG. 2.

Process 1200 continues to 1216, where the media guidance application updates (e.g., via control circuitry 504) the data structure to associate the user specific level of difficulty with the second value. For example, the media guidance application may update the second data structure indicating accent list 208 to associate the user specific level of difficulty with updated user specific level of difficulty 224 of six as described in relation to FIG. 2.

Figure 13:
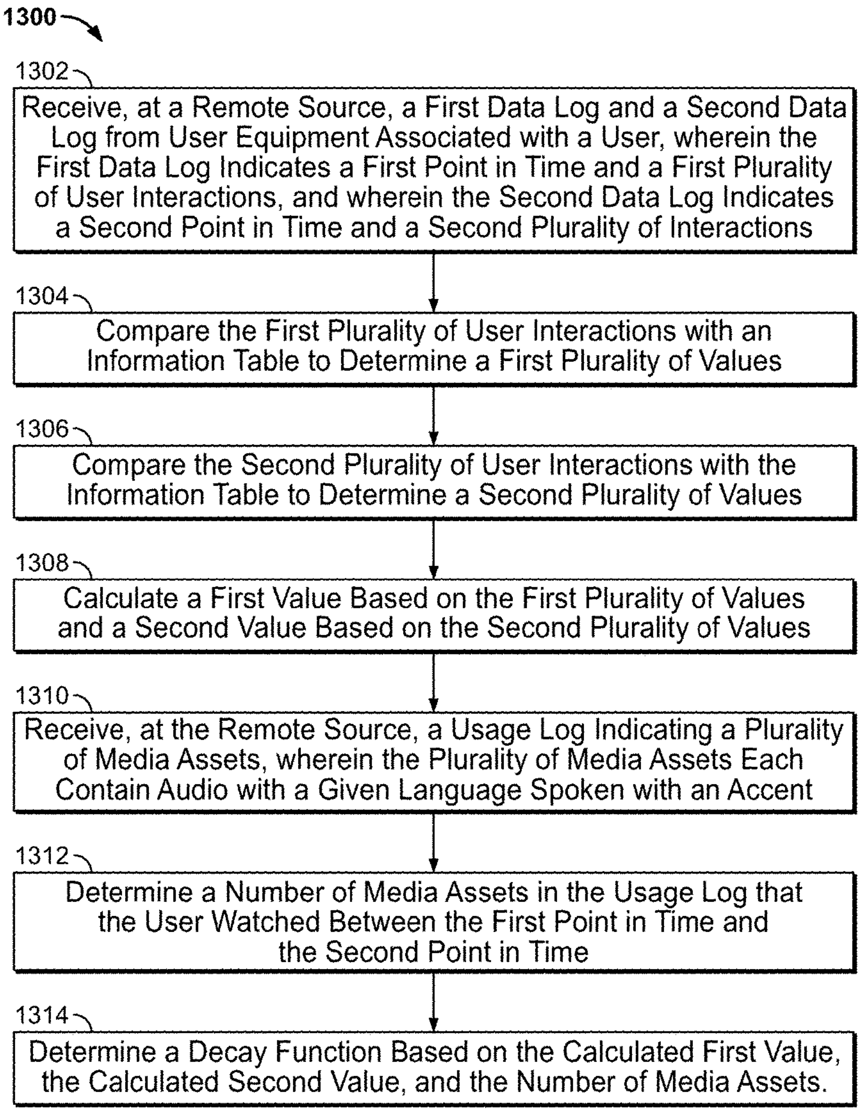
FIG. 13 is a flowchart of illustrative steps for determining a decay function relating the number of media assets watched that contain a given language with an accent and a user specific level of difficulty, in accordance with some embodiments of the disclosure.

FIG. 13 is a flowchart of illustrative steps for determining a decay function relating the number of media assets watched that contain a given language with an accent and a user specific level of difficulty, in accordance with some embodiments of the disclosure. For example, a media guidance application may instruct control circuitry 504 to execute the elements of process 1300.

Process 1300 begins at 1302, where the media guidance application receives (e.g., via control circuitry 504), at a remote source (e.g., media guidance data source 618) a first data log and a second data log from user equipment associated with a user, wherein the first data log indicates a first point in time and a first plurality of user interactions, and wherein the second data log indicates a second point in time and a second plurality of interactions. For example, the media guidance application may receive data logs similar to those described in relation to automatically determining user specific level of difficulty 224 in relation to FIG. 2. As an illustrative example, the second data log may indicate that the second user said "What?" and enabled subtitles on Mar. 1, 2015 at 7:00 AM and the third data log may indicate that the second user raised the volume of the TV and put a hand to their ear on Jun. 25, 2015 at 5:45 PM as described in relation to FIG. 2.

Process 1300 continues to 1304, where the media guidance application compares (e.g., via control circuitry 504) the first plurality of user interaction with an information table to determine a first plurality of values. For example, the media guidance application may determine the first plurality of values based on information table 1002, as described above in relation to automatically determining user specific level of difficulty 224 above, in relation to FIG. 2. Process 1300 continues to 1306, where the media guidance application compares (e.g., via control circuitry 504 in storage 508) the second plurality of user interactions with the information table to determine a second plurality of values. For example, the media guidance application may do so in a similar manner as described above in relation to 1304 and in relation to FIG. 2.

Process 1300 continues to 1308, where the media guidance application calculates (e.g., via control circuitry 504) a first value based on the first plurality of values and a second value based on the second plurality of values. The media guidance application may do so in an manner described above in relation to automatically determining user specific level of difficulty 224 in relation to FIG. 2.

Process 1300 continues to 1310, where the media guidance application receives (e.g., via control circuitry 504), at the remote source (e.g., media guidance data source 518), a usage log indicating that a plurality of media assets, wherein the plurality of media assets each contain audio with a given language spoken with an accent. For example, the usage log may be similar to the usage log described above in relation to FIG. 2.

Process 1300 continues to 1312, where the media guidance application determines (e.g., via control circuitry 504) a number of media assets in the usage log that the user watched between the first point in time and the second point in time. The media guidance application may compare the time the user watched each media asset in the usage log to the first and second points in time to determine which of the plurality of media assets in the usage log were between the two times, as described in relation to determining the decay function associating user specific level of difficulty 224 and the number of media assets as described in relation to FIG. 2.

Process 1300 continues to 1314, where the media guidance application determines (e.g., via control circuitry 504) a decay function based on the calculated first value, the calculated second value, and the number of media assets. For example, the media guidance application may determine an exponential decay function based on the first value of 17, the second value of 11, and the number of media assets of 1, as described above in relation to FIG. 2.

The above-described embodiments of the present disclosure are presented for purposes of illustration and not of limitation, and the present disclosure is limited only by the claims that follow. Additionally, it should be noted that any of the devices or equipment discussed in relation to FIGS. 4-5 could be used to perform one or more of the steps in processes 700-900 and 1100-1300 in FIGS. 7-9 and 11-13, respectively. Furthermore, it should be noted that the features and limitations described in any one embodiment may be applied to any other embodiment herein, and flowcharts or examples relating to one embodiment may be combined with any other embodiment in a suitable manner, done in different orders, performed with addition steps, performed with omitted steps, or done in parallel. For example, each of these steps may be performed in any order or in parallel or substantially simultaneously to reduce lag or increase the speed of the system or method. In addition, the systems and methods described herein may be performed in real time. It should also be noted that the systems and/or methods described above may be applied to, or used in accordance with, other systems and/or methods.

What is claimed is:

1. A method for automatically displaying explanatory messages based on a user profile when a language is spoken with an accent in a media asset, the method comprising:

storing, in a user profile, a first data structure indicating a list of one or more languages that the user understands;

determining, at a first point in time, that a language is being spoken in the media asset with an accent by:

performing natural language processing to detect an audio signature of the language;

determining, based on the audio signature, that the language is being spoken with an accent;

identifying the language spoken in the media asset; and determining that the identified language spoken in the media asset matches one of the languages in the list of one or more languages that the user understands;

receiving, from a remote source, information needed to populate the explanatory messages;

extracting from the user profile a user specific level of difficulty being indicative of a measure of difficulty the user has in understanding the language when spoken with an accent; and in response to determining that the language is being spoken in the media asset with the accent, automatically generating for display explanatory messages for the media asset based on the user specific level of difficulty.

2. The method of claim 1, wherein the information needed to populate the explanatory messages is received based on searching a dictionary of dialects.

3. The method of claim 1, wherein the information needed to populate the explanatory messages is received based on searching the Internet for an indication of alternate words for, or definitions of, a word.

4. The method of claim 1, wherein the user specific level of difficulty is determined by detecting a plurality of user interactions of the user while the language is being spoken with the accent.

5. The method of claim 4, further comprising:

retrieving, from the remote source, an information table associating user interactions with levels of difficulty being indicative of a measure of difficulty a plurality of users have in understanding accents;

determining a plurality of values by associating each user interaction of the plurality of user interactions with a value and;

determining the user specific level of difficulty based on the plurality of values.

6. The method of claim 5, wherein determining the user specific level of difficulty based on the plurality of values comprises one of calculation a sum of the plurality of values, calculating an average of the plurality of values, and multiplying the sum of the plurality of values by the number of values in the plurality of values.

7. The method of claim 4, further comprising:

detecting that the language is being spoken with the accent at a later point in time;

monitoring user interactions of the user while the language is being spoken with the accent at the later point in time; and updating, based on determining that the first plurality of user interactions are not being performed again, a second data structure, the second data structure associating a second value that is lower than the first value with the user specific level of difficulty.

8. The method of claim 1, wherein detecting that a media asset includes the language spoken with the accent includes determining an accent level, the accent level indicating how slight the accent is, the method further comprising:

comparing the accent level to the user specific level of difficulty to determine if the user specific level of difficulty is greater than the accent level; and wherein automatically generating for display explanatory messages for the media asset is further based on determining that the user specific level of difficulty is greater than the accent level.

9. The method of claim 1, wherein detecting that a media asset includes the language spoken with the accent comprises:

receiving, from a media source, the media asset and information indicating a first portion of the media asset during which a specific actor appears;

identifying an accent level associated with the specific actor; and wherein automatically generating for display explanatory messages for the media asset comprises automatically generating for display explanatory messages for the media asset when the user specific level of difficulty exceeds the accent level.

10. The method of claim 1, wherein receiving, from the remote source, information needed to populate the explanatory messages comprises:

generating, at the media device, a search query for the language;

transmitting the search query to the remote source; and receiving, from the remote source, as a response to the search query, information needed to populate the explanatory messages.

11. A system for automatically displaying explanatory messages based on a user profile when a language is spoken with an accent in a media asset, the system comprising:

control circuitry configured to:

store, in a user profile, a first data structure indicating a list of one or more languages that the user understands;

determine, at a first point in time, that a language is being spoken in the media asset with an accent by:

performing natural language processing to detect an audio signature of the language;

determining, based on the audio signature, that the language is being spoken with an accent;

identifying the language spoken in the media asset; and determining that the identified language spoken in the media asset matches one of the languages in the list of one or more languages that the user understands;

receive, from a remote source, information needed to populate the explanatory messages;

extract from the user profile a user specific level of difficulty being indicative of a measure of difficulty the user has in understanding the language when spoken with an accent; and in response to determining that the language is being spoken in the media asset with the accent, automatically generate for display explanatory messages for the media asset based on the user specific level of difficulty.

12. The system of claim 11, wherein the information needed to populate the explanatory messages is received based on searching a dictionary of dialects.

13. The system of claim 11, wherein the information needed to populate the explanatory messages is received based on searching the Internet for an indication of alternate words for, or definitions of, a word.

14. The system of claim 11, wherein the user specific level of difficulty is determined by detecting a plurality of user interactions of the user while the language is being spoken with the accent.

15. The system of claim 14, wherein the control circuitry is further configured to:

retrieve, from the remote source, an information table associating user interactions with levels of difficulty being indicative of a measure of difficulty a plurality of users have in understanding accents;

determine a plurality of values by associating each user interaction of the plurality of user interactions with a value and;

determine the user specific level of difficulty based on the plurality of values.

16. The system of claim 15, wherein the control circuitry is configured to determine the user specific level of difficulty based on the plurality of values by one of calculation a sum of the plurality of values, calculating an average of the plurality of values, and multiplying the sum of the plurality of values by the number of values in the plurality of values.

17. The system of claim 14, wherein the control circuitry is further configured to:

detect that the language is being spoken with the accent at a later point in time;

monitor user interactions of the user while the language is being spoken with the accent at the later point in time; and update, based on determining that the first plurality of user interactions are not being performed again, a second data structure, the second data structure associating a second value that is lower than the first value with the user specific level of difficulty.

18. The system of claim 11, wherein:

the control circuitry configured to detect that a media asset includes the language spoken with the accent is further configured to determine an accent level, the accent level indicating how slight the accent is;

the control circuitry is further configured to compare the accent level to the user specific level of difficulty to determine if the user specific level of difficulty is greater than the accent level; and the control circuitry configured to automatically generate for display explanatory messages for the media asset is further configured to generate for display explanatory messages based on determining that the user specific level of difficulty is greater than the accent level.

19. The system of claim 11, wherein:

the control circuitry configured to detect that a media asset includes the language spoken with the accent is configured to:

receive, from a media source, the media asset and information indicating a first portion of the media asset during which a specific actor appears;

identify an accent level associated with the specific actor; and the control circuitry configured to automatically generate for display explanatory messages for the media asset is further configured to automatically generate for display explanatory messages for the media asset when the user specific level of difficulty exceeds the accent level.

20. The system of claim 11, wherein the control circuitry configured to receive, from the remote source, information needed to populate the explanatory messages is further configured to:

generate, at the media device, a search query for the language;

transmit the search query to the remote source; and receive, from the remote source, as a response to the search query, information needed to populate the explanatory messages.

* * * * *

UNITED STATES PATENT AND TRADEMARK OFFICE

CERTIFICATE OF CORRECTION

PATENT NO. : 10,182,266 B2
APPLICATION NO. : 15/816602
DATED : January 15, 2019
INVENTOR(S) : Vishwas Sharadanagar Panchaksharaiah et al.

It is certified that error appears in the above-identified patent and that said Letters Patent is hereby corrected as shown below:

In the Claims

At Column 57, Claim 1, Line 6, change "an accent" to -- the accent --

At Column 58, Claim 11, Line 38, change "an accent" to -- the accent --

Signed and Sealed this
Ninth Day of April, 2019

Andrei Iancu
*Director of the United States Patent and Trademark Office*